(12) United States Patent
Kito et al.

(10) Patent No.: US 6,498,203 B1
(45) Date of Patent: Dec. 24, 2002

(54) RUBBER-ERASABLE AQUEOUS INK FOR WRITING MATERIAL COMPOSITION AND WRITING MATERIALS USING THE SAME

(75) Inventors: Tsutomu Kito, Aichi (JP); Hiroyuki Hayashi, Aichi (JP); Hiroyuki Nakamura, Aichi (JP)

(73) Assignee: The Pilot Ink Co., Ltd., Aichi (JP)

( * ) Notice: Subject to any disclaimer, the term of this patent is extended or adjusted under 35 U.S.C. 154(b) by 0 days.

(21) Appl. No.: 09/453,477

(22) Filed: Dec. 2, 1999

(30) Foreign Application Priority Data

Dec. 3, 1998 (JP) ............ 10-361897
May 6, 1999 (JP) ............ 11-126455
May 6, 1999 (JP) ............ 11-126456

(51) Int. Cl.$^7$ ............ C09D 11/16; C09D 11/18; C08L 33/08; C08L 33/10
(52) U.S. Cl. ............ 523/161; 524/523; 524/556; 524/560
(58) Field of Search ............ 523/160, 161; 106/31.6; 524/556, 567, 523, 560

(56) References Cited

U.S. PATENT DOCUMENTS

| | | | |
|---|---|---|---|
| 4,389,499 A | | 6/1983 | Riesgraf |
| 4,390,646 A | | 6/1983 | Ferguson |
| 4,391,927 A | | 7/1983 | Farmer, III |
| 4,786,198 A | * | 11/1988 | Zgambo ............ 401/142 |
| 4,940,628 A | * | 7/1990 | Lin et al. ............ 428/207 |
| 5,120,359 A | | 6/1992 | Uzukawa et al. |
| 5,272,212 A | * | 12/1993 | Kitahara ............ 430/106.6 |
| 5,324,764 A | * | 6/1994 | Fujita et al. ............ 524/377 |
| 5,621,021 A | | 4/1997 | Yoshioka et al. |
| 5,661,197 A | | 8/1997 | Villiger et al. |
| 5,852,073 A | * | 12/1998 | Villiger et al. ............ 523/161 |
| 5,905,102 A | * | 5/1999 | Nagasawa et al. ............ 523/161 |
| 5,961,704 A | * | 10/1999 | Nakamura et al. ............ 106/31.32 |
| 5,990,201 A | * | 11/1999 | Miyazaki et al. ............ 523/161 |
| 6,031,024 A | * | 2/2000 | Uraki et al. ............ 523/161 |
| 6,306,930 B1 | * | 10/2001 | Tsujio ............ 523/161 |

FOREIGN PATENT DOCUMENTS

| | | |
|---|---|---|
| EP | 0 061 886 A1 | 10/1982 |
| JP | 04332776 | * 5/1991 |
| JP | 4-332776 | 11/1992 |

OTHER PUBLICATIONS

Lewis Sr., Richard J.; Hawley's Condensed Chemical Dictionary 13th Ed., John Wiley and Sons, New York (pp. 18 and 907–908), 1997.*
Odian, George; Principles of Polymerization 3rd Ed., John Wiley and Sons, New York (p. 303), 1991.*
English Translation of JP04332776, 1992.*
XP–002132471—Abstract (1992).
European Search Report (2000).

* cited by examiner

*Primary Examiner*—Vasu Jagannathan
*Assistant Examiner*—Callie E. Shosho
(74) *Attorney, Agent, or Firm*—Sughrue Mion, PLLC

(57) ABSTRACT

A rubber-erasable aqueous ink for a writing material composition contains water, a water-soluble polar solvent, and a particulate adhesive colored resin. The particulate adhesive colored resin contains a pigment and an adhesive resin which is adhesive on at least a part of a surface thereof. The particulate adhesive colored resin has a particle diameter distribution such that the amount of particles having a particle diameter of from 2 $\mu$m to 20 $\mu$m is not less than 70% by weight of all the particles.

23 Claims, 2 Drawing Sheets

RUBBER-ERASABLE AQUEOUS INK FOR WRITING MATERIAL COMPOSITION AND WRITING MATERIALS USING THE SAME

FIELD OF THE INVENTION

The present invention relates to a rubber-erasable aqueous ink for a writing material composition and writing materials including same incorporated therein. More particularly, the present invention relates to a rubber-erasable aqueous ink for a writing material composition which gives onto paper writing that can be easily erased by an eraser but can be retained thereon even when normally rubbed with finger or paper. Even more particularly, the present invention relates to a rubber-erasable aqueous ink for a writing material composition which, when heated, exhibits a permanent fixability such that writing cannot be erased even when vigorously rubbed.

DESCRIPTION OF THE RELATED ART

Many proposals have been heretofore made on ink compositions which provide writing that can be erased by an eraser. These ink compositions can be roughly divided into two groups, i.e., oil ink including a colorant and a vehicle containing a resin dissolved in an organic solvent as a main solvent and aqueous ink including these components dissolved in water as a main solvent. Examples of the oil ink include rubber-erasable aqueous ink for a writing material compositions for ball point pen including a pigment, a specific organic solvent and an elastomer resin having rubber elasticity as disclosed in U.S. Pat. Nos. 4,389,499, 4,390,646 and 4,391,927. The foregoing ink composition includes a resin having a high molecular weight and thus exhibits a high viscosity. In this arrangement, it is tried to prevent the pigment from penetrating deep into paper together with the solvent, making the writing formed by the pigment on paper erasable by an eraser. However, the foregoing ink composition can be practically erased by an eraser for a short period of time after writing but can be erased less gradually with time.

Another disadvantage of the foregoing oil ink composition is that since the solvent used is hardly volatile and thus is normally slow-drying after applied to paper, the ink composition which has just been applied, even when lightly rubbed with finger or hand, causes the undried portion to move to blank area (area around the writing), causing remarkable stain on paper as well as on finger or hand, even on clothing On the other hand, many proposals have been recently made on rubber-erasable aqueous ink for a writing material composition including water as a main solvent. One of these proposals is a rubber-erasable ink composition including a pigment in an amount of from 1 to 50%, a resin having a film-forming temperature of not lower than 40° C. in an amount of from 3 to 50%, an organic solvent in an amount of 0.5 to 50% and water in an amount of from 7 to 60% based on the total weight of ink as disclosed in JP-A-4-332776. Since the foregoing ink composition includes a general-purpose pigment that can easily penetrate deep into paper, it can be fairly erased by an eraser. Further, since the resin cannot form a film at room temperature, the film (writing) can be poorly preserved.

Another proposal is an erasable ink composition including a water-insoluble polymer-capsuled colorant obtained by subjecting at least one emulsion-polymerizable monomer including a colorant dissolved therein to polymerization under emulsion polymerization conditions as disclosed in U.S. Pat. No. 5,661,197. In this proposal, a capsuled colorant including a colorant incorporated in a water-insoluble polymer is prepared under emulsion polymerization conditions. The resulting capsuled colorant includes finely divided particles having a diameter of not more than 1 μm. As a result, when the ink composition is applied to paper, the finely divided colorant particles penetrate deep into paper and are trapped by paper. Thus, the foregoing ink composition can be poorly erased by an eraser. Further, the water-insoluble dye to be incorporated in the capsuled colorant is liable to extraction in the aqueous vehicle with the water-soluble polar solvent or surfactant in the aqueous vehicle. The dye thus extracted dyes the surface of paper to an extent such that the trace of writing can be left unerased even when rubbed with an eraser.

A further proposal is an erasable ink having a viscosity of from 5 to 35 mPa·s including a resin having a film-forming temperature of not higher than 0° C. and a glass transition temperature of not higher than 0° C., a particulate colored resin having a particle diameter of from 1 μm to 20 μm and water as disclosed in U.S. Pat. No. 5,621,021. In an attempt to prevent the trace of the writing from being left unerased when rubbed, the foregoing erasable ink includes colored resin particles having a great diameter which can less penetrate deep into paper. Nevertheless, the particulate resin used has a particle diameter which is not so small enough and thus can easily penetrate deep into paper. Thus, the particulate colored resin exhibits an enhanced adhesivity to the surface of paper and to each other. Accordingly, the foregoing erasable ink differs greatly in rubber-erasability from paper to paper.

Further, the use of the foregoing conventional rubber-erasable ink compositions for important document such as official document which allows no alteration and document containing date and amount of money is limited.

SUMMARY OF THE INVENTION

It is an object of the present invention to provide ink composition which can eliminate the foregoing disadvantages of the foregoing erasable ink compositions, that is, can not only be fairly erased by an eraser but also be fairly retained on paper.

As a result of the inventor's extensive studies of such ink composition, the inventors paid their attention to the fact that the use of finely divided particles having a particle diameter of not greater than about 1 μm as at least one of coloring element and bonding element has an adverse effect on the rubber-erasability of the conventional ink compositions.

The foregoing particles concerning coloring element and bonding element can penetrate less deep into paper or can easily prevent themselves from penetrating deep into paper if they have a sufficient particle diameter. Taking into account the normal distribution of the particles which have just been prepared, if the particles are distributed in a range of from 2 μm to 20 μm they can almost prevent themselves from penetrating deep into paper. These conditions must be applied both to coloring particles and bonding particles. In other words, even if the particle diameter of the coloring agent falls within the range of from 2 μm to 20 μm, when the particle diameter of the bonding particles falls within the range of from 0.1 μm to 1 μm as in general-purpose resin dispersion, the bonding particles penetrate deep into paper to strongly fix the coloring particles to the surface of paper from behind, making it impossible to obtain a good rubber-erasability. On the contrary, if the particulate coloring agent has a particle diameter of from 0.1 μm to 1 μm, the coloring agent itself penetrates deep into paper regardless of the particle diameter of the bonding particles, making it impossible to obtain a good rubber-erasability. It can therefore be presumed that all the conventional ink compositions are liable to penetration of particulate coloring agent and/or adhesive into paper and thus can attain neither good rubber-erasability nor high fretting resistance. It was thus found concerning the relationship between the penetration of particles into paper and the particle diameter that if the particles concerning coloring element and bonding element have a particle diameter of not less than about 2 μm, the penetration of particles into paper can be lessened or eliminated. The present invention has thus been worked out.

Further, an unprecedented knowledge was found that the incorporation of "heat-sensitive element" in a particulate colored ink composition containing coloring agent particles and bonding particles or the incorporation of "heat-sensitive element" having particles distributed in a particle diameter range of from 2 μm to 20 μm in an ink composition containing particles having coloring properties and adhesive properties makes it possible to provide a writing that can be permanently fixed when subjected to heat treatment. The present invention has thus been worked out.

DETAILED DESCRIPTION OF THE INVENTION

Figure 1:
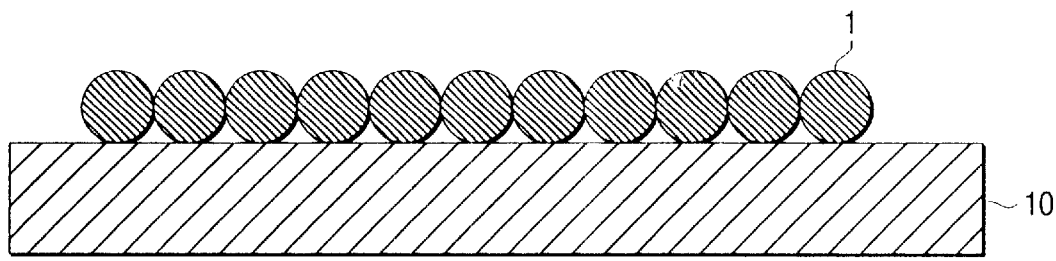
FIG. 1 is an enlarged vertical section of writing formed by the rubber-erasable aqueous ink for a writing material composition of the present invention including a particulate adhesive colored resin incorporated therein.

The present invention will be described in detail as follows.

According to the present invention, a rubber-erasable aqueous ink for a writing material composition includes a particulate adhesive colored resin, water and a water-soluble polar solvent. The particulate adhesive colored resin is made of a pigment and an adhesive resin. At least a part of the surface of the particulate adhesive colored resin is adhesive. The particulate adhesive colored resin has a particle diameter distribution such that the amount of particles having a particle diameter of from 2 μm to 20 μm is not less than 70% by weight of all the particles. Further, it is preferable that a rubber-erasable aqueous ink for a writing material composition as defined above, includes a particulate thermoplastic resin having a particle diameter distribution such that the amount of particles having a particle diameter of from 2 μm to 20 μm is not less than 70% by weight of all the particles.

Further, according to the present invention, the rubber-erasable aqueous ink for a writing material composition including at least a particulate colored resin containing a pigment, a particulate adhesive resin, water, and a water-soluble polar solvent, wherein the particulate colored resin and particulate adhesive resin each having a particle diameter distribution such that the amount of particles having a particle diameter of from 2 μm to 20 μm is not less than 70% by weight of all the particles. Moreover, the rubber-erasable aqueous ink for a writing material composition as defined above, wherein the particulate colored resin is a particulate colored thermoplastic resin.

Furthermore, the rubber-erasable aqueous ink includes a shear-thinning agent incorporated therein and exhibiting a viscosity of from 25 to 160 mPa·s (determined at 25° C. by means of an EMD type viscometer) and a shear-thinning index of from 0.1 to 0.7 at 100 rpm. The present invention further provides a ballpoint pen, a marking pen and the like using this rubber-erasable aqueous ink.

In a first aspect of the present invention, a rubber-erasable aqueous ink for a writing material composition including a particulate adhesive colored resin incorporated therein, the particulate adhesive colored resin having a particle diameter distribution such that the amount of particles having a particle diameter of from 2 μm to 20 μm is not less than 70% by weight of all the particles.

The particulate adhesive colored resin will be further described hereinafter.

In order to lessen or eliminate the penetration of particles (pigment and/or resin) into paper, the particulate adhesive colored resin includes particles containing both coloring element and bonding element having a particle diameter of from 2 μm to 20 μm which exhibit adhesive properties to satisfy both requirements for good rubber-erasability and high fretting resistance (preservability of writing at ordinary times).

A great feature of the foregoing rubber-erasable aqueous ink for a writing material composition is that the particulate adhesive colored resin used exhibits the following properties:

(1) Extremely low penetration into paper; and
(2) Adhesive properties satisfying both good rubber-erasability and high fretting resistance.

In other words, the use of such a particulate adhesive colored resin essentially makes it possible to eliminate the necessity of adding a resin or adhesive for providing adhesive properties. Further, the use of the particulate adhesive colored resin essentially makes it possible to eliminate the necessity of adding a coloring agent for coloring. In other words, again, the foregoing particulate adhesive colored resin itself has two functions, i.e., bonding and coloring.

Referring to the writing formed by the foregoing rubber-erasable aqueous ink for a writing material composition, the inventors adduce as follows the reason why the writing thus formed exhibits both a good rubber-erasability and a high fretting resistance at the same time. In other words, when the writing formed by the ink composition of the present invention is observed under microscope, the particulate adhesive colored resin 1 is, of course, observed present on the surface of paper 10. The most of the particles 1 are observed point-bonded to each other as shown in FIG. 1. Further, the gap between the particles is occupied by the space. Accordingly, when rubbed with an eraser, the writing can be fairly erased because it is formed by aggregates of the adhesive colored resin particles 1. When normally rubbed, the writing cannot be peeled off up to a predetermined frictional force because it is bonded to paper by a predetermined adhesion developed by the bonding of the particulate adhesive colored resin 1 to the surface of paper 10.

Accordingly, the foregoing writing is similar to writing formed by pencil in characteristics and thus can be erased by an eraser. Further, the foregoing writing can withstand ordinary friction of sheets of paper or fretting by hand or finger during writing. The preservability or fretting resistance of writing at ordinary times is almost equal to that of the writing formed by a pencil having a hardness of "HB" or "H".

The adhesive properties of the foregoing particulate adhesive colored resin are meant to indicate that the particulate material can be erased by an eraser but exhibits the lowest required adhesivity with respect to light fretting. In other words, if the particulate adhesive colored resin exhibits too strong an adhesivity, it can be less erased by an eraser or cannot be fairly erased unless rubbed by an eraser with a strong frictional force. On the contrary, if the particulate adhesive colored resin exhibits too weak an adhesivity, it can be easily peeled even when lightly rubbed. Accordingly, the adhesivity of the particulate adhesive colored resin needs to be adjusted such that a good rubber-erasability and a high fretting resistance can be attained at the same time.

The foregoing adhesive properties are not determined by the glass transition point (Tg) of the adhesive resin alone. In general, the adhesive properties are determined by various factors. Examples of the main factors determining the adhesive properties include characteristics of resin itself, such as crystallizability, fluidity, glass transition point, molecular weight and cross-link density. Many such factors have complicated participation in the determination of the adhesive properties. For example, styrene-butadiene rubber (SBR) having a glass transition point of −58° C. exhibits no adhesivity at room temperature and thus is rubber-like and brittle. On the other hand, a butyl polyacrylate having a glass transition point of −45° C. exhibits a strong adhesivity at room temperature.

The foregoing particulate adhesive colored resin is not specifically limited in its preparation method so far as the particulate colored resin containing a pigment is adhesive at least on the surface thereof. The foregoing particulate adhesive colored resin can be obtained by a known technique for synthesis of resins. Examples of the form of the particulate adhesive colored resin include a structure wherein the entire resin constituting the particulate colored resin is a homogeneous polymer composition having an adhesivity, a structure composed of a particulate colored resin the surface of which is entirely coated with a polymer composition having an adhesivity, and a structure composed of a particulate colored resin a part of the surface of which is formed by a polymer composition having a continuous or discontinuous adhesivity.

The preparation of the foregoing particulate adhesive colored resin can be accomplished by suspension polymerization method, suspension polycondensation method, suspension addition reaction method, seed polymerization method, dispersion polymerization method or submerged drying method. In order to obtain the foregoing structure wherein the entire resin constituting the particulate colored resin is a homogeneous polymer composition having an adhesivity, suspension polymerization method or submerged solvent evaporation method can be mainly used. On the other hand, in order to obtain the structure composed of a particulate colored resin a part or whole of the surface of which is formed by a polymer composition having a continuous or discontinuous adhesivity, suspension polymerization method, suspension polycondensation method, suspension addition reaction method, seed polymerization method, dispersion polymerization method and submerged solvent evaporation method can be used in proper combination. Alternatively, a secondary surface modification method can be used.

As an index for providing the particulate adhesive colored resin with a proper adhesivity, it is preferred that the particulate adhesive colored resin thus obtained exhibit a glass transition point of lower than 40° C. If the adhesive resin used exhibits a glass transition point of not lower than 40° C., the resulting writing exhibits a weak adhesivity at room temperature and thus cannot attain a desired fretting resistance.

The polymerization method concerning the preparation of the particulate adhesive colored resin will be further described hereinafter. Suspension polymerization method is a method by emulsifying or dispersing a water-insoluble monomer or oligomer having a pigment dispersed therein in water as fine oil droplets in the presence of a dispersing agent, and then subjecting the emulsion or dispersion to polymerization under suspension polymerization conditions in the presence of a lipophilic initiator. In general, it is said that the size of particles obtained by the suspension polymerization method ranges from scores of micrometer to several millimeters. By properly selecting the kind of emulsifier, dispersion stabilizer and viscosity adjuster, a particulate adhesive colored resin having a particle diameter distribution of from 2 $\mu$m to 20 $\mu$m desirable for the present invention can be synthesized.

Suspension polycondensation method or suspension addition reaction method is a method which includes dispersing a pigment in a polycondensable or addition-reactive monomer or prepolymer optionally in the presence of a solvent, emulsifying or dispersing the dispersion as fine oil droplets in the presence of a hydrophilic dispersing agent, and then subjecting the emulsion or dispersion to polymerization by polycondensation reaction or addition reaction. Seed polymerization method is a method which includes allowing a previously synthesized particulate resin as a seed to absorb the same or different kind of a monomer for further polymerization so that the seed grows. In the present invention, seed polymerization method can be preferably used in the preparation of a particulate adhesive colored resin by secondary treatment.

Dispersion polymerization method is a method which includes polymerization of a monomer in a solvent which dissolves the monomer therein but doesn't dissolve a polymer therein in the presence of a dispersion stabilizer so that the polymer thus produced is precipitated to obtain particles. Similarly to the seed polymerization method, the dispersion polymerization method can be preferably used mainly in the preparation of a particulate adhesive colored resin by secondary treatment.

The foregoing secondary treatment is a treatment which includes modifying primary particles (including a pigment and a resin) obtained so that they are rendered adhesive regardless of whether or they are adhesive.

Submerged solvent evaporation method is a method which includes subjecting a dispersion obtained by dispersing a pigment in a polymer dissolved in a solvent to suspension emulsification in water in the presence of a hydrophilic dispersing agent, and then distilling the solvent off the emulsion under heating or reduced pressure to obtain a particulate polymer. similarly to the suspension polymerization method, the submerged solvent evaporation method can be used mainly in the synthesis of a particulate adhesive colored resin having a homogeneous polymer composition.

A preferred polymerization method for obtaining the particulate adhesive colored resin of the present invention is suspension polymerization method.

The particle diameter of the particulate adhesive colored resin will be further described hereinafter.

The particulate adhesive colored resin to be incorporated in the rubber-erasable aqueous ink for a writing material composition of the present invention needs to have a particle diameter distribution such that the amount of particles having a particle diameter of from 2 $\mu$m to 20 $\mu$m is not less than 70% by weight of all the particles, preferably the amount of particles having a particle diameter of from 2 $\mu$m to 15 $\mu$m is not less than 80% by weight of all the particles.

The particle diameter and the rubber-erasability of the foregoing particulate adhesive colored resin are closely related to each other. If the proportion of particles having a particle diameter of less than 2 $\mu$m is too great, the proportion of particles penetrating into the gap between paper fibers is remarkably great, making it impossible to obtain a good rubber-erasability. On the contrary, if the proportion of particles having a particle diameter of greater than 2 $\mu$m is too great, the resulting writing can be easily peeled off when rubbed with hand or finger, making it difficult to attain a satisfactory fretting resistance. Further, the resulting ink can be hardly discharged from the outlet of various writing materials such as fiber pen, plastic pen, felt tip and ball tip.

The particulate adhesive colored resin obtained by the foregoing various polymerization method may be optionally subjected to dry classification or wet classification such as centrifugal sedimentation so that the particle diameter distribution thereof satisfies the foregoing requirements.

The wet classification can be accomplished by subjecting the dispersion of the particulate material in a medium such as water to classification by centrifugal sedimentation or natural sedimentation method. The removal of coarse grains can be effectively accomplished by filtration through a filter paper, filter or the like.

On the other hand, the dry classification can be accomplished by subjecting a dried particulate material to classification by means of a machine such as variable impactor, cyclon, classiclon, turbo classifier and micron separator. Classification may be repeated by a plurality of times to obtain a desired particle size distribution. The dry classification is used also in the classification of toner for electrophotographic copy.

The use of the foregoing classification methods singly or in combination makes it possible to obtain a particulate material having a particle diameter distribution such that the amount of particles having a particle diameter of from 2 $\mu$m to 20 $\mu$m is not less than 70% by weight of all the particles. Further, in order to obtain a particulate material having a more uniform particle diameter, i.e., particulate material including particles the diameter of which falls within a narrow range, the foregoing classification may be repeated. Alternatively, a method may be used involving the expansion of undesirable particle diameter range.

However, since the foregoing particulate adhesive colored resin normally stays adhesive, it can be hardly subjected to dry classification in general. Therefore, the particles are preferably adjusted such that the amount of particles having a particle diameter of from 2 $\mu$m to 20 $\mu$m is not less than 70% by weight of all the particles as much as possible during its preparation. If classification is required, wet classification may be used. For example, filtration by a filter paper, filter or the like or centrifugal sedimentation is preferably used.

The reactive monomer to be used in the preparation of the particulate adhesive colored resin by radical polymerization such as suspension polymerization, seed polymerization and dispersion polymerization will be further described hereinafter.

As the reactive monomer to be used in the present invention there may be used a substantially water-insoluble or difficultly water-soluble reactive monomer.

Examples of radical-polymerizable monofunctional monomer employable as such include acrylic acid esters such as ethyl acrylate, methyl acrylate, n-propyl acrylate, i-propyl acrylate, n-butyl acrylate, i-butyl acrylate, t-butyl acrylate, amyl acrylate, hexyl acrylate, 2-ethylhexyl acrylate, cyclohexyl acrylate, n-octyl acrylate, nonyl acrylate, decyl acrylate, undecyl acrylate, lauryl acrylate, myristyl acrylate, cetyl acrylate, stearyl acrylate, 2-methoxyethyl acrylate, 2-ethoxyethyl acrylate, benzyl acrylate, 2-hydroxyethyl acrylate and glycidyl acrylate, methacrylic acid esters such as methyl methacrylate, ethyl methacrylate, n-propyl methacrylate, i-propyl methacrylate, n-butyl methacrylate, i-butyl methacrylate, t-butyl methacrylate, amyl methacrylate, hexyl methacrylate, 2-ethylhexyl methacrylate, cyclohexyl methacrylate, n-octyl methacrylate, nonyl methacrylate, decyl methacrylate, undecyl methacrylate, lauryl methacrylate, myristyl methacrylate, cetyl methacrylate, stearyl methacrylate, 2-methoxyethyl methacrylate, 2-ethoxyethyl methacrylate, benzyl methacrylate, 2-hydroxyethyl methacrylate, and glycidyl methacrylate; aromatic monomers such as styrene, α-methylstyrene, β-methylstyrene, vinyltoluene, t-butylstyrene, chlorostyrene, vinylbenzyl chloride and vinyl pyridine; unsaturated nitriles such as acrylonitrile, and unsaturated esters of saturated carboxylic acid such as vinyl acetate. The prefixes n, i and t in the foregoing monomers indicate normal, iso and tertiary, respectively.

These monofunctional monomers may be used singly or in the form of proper mixture depending on the desired adhesivity. A hydrophilic monomer such as acrylic acid and methacrylic acid may be optionally added in an amount of not more than 5% by weight based on the total weight of monomers to provide the suspended particles with dispersion stability.

Examples of polyfunctional monomer employable herein include ethylene glycol dimethacrylate, diethylene glycol dimethacrylate, neopentyl glycol dimethacrylate, trimethylol propane trimethacrylate, pentaerythritol tetramethacrylate, ethylene glycol diacrylate, diethylene glycol diacrylate, neopentyl glycol diacrylate, trimethylol propane triacrylate, pentaerythritol tetraacrylate, divinylbenzene, triethylene glycol divinyl ether, butadiene, and isoprene.

In the present invention, a monofunctional monomer alone may be subjected to polymerization free from polyfunctional monomer. In practice, however, the monofunctional monomer is preferably used in combination with a bifunctional or polyfunctional monomer to enhance the physical strength of the particulate adhesive colored resin. The ratio of polyfunctional monomer to monofunctional monomer is preferably from 2:100 to 10:100. If the proportion of the polyfunctional monomer falls below 2, the resulting particulate material exhibits a reduced physical strength and, when rubbed with an eraser, can be destroyed to cause the pigment to be exposed, easily staining the surface of paper. On the contrary, if the proportion of the polyfunctional monomer exceeds 10, the resulting particulate material tends to have a reduced adhesivity, making it impossible to obtain a desired fretting resistance.

Further, the addition of the polyfunctional monomer also makes a great contribution to the stability of the particulate adhesive colored resin during preparation or in the ink composition. In other words, the adhesive colored resin particles can easily be aggregated to each other because they stay adhesive at room temperature and have a relatively great particle diameter. In order to eliminate or lessen these difficulties, the polyfunctional monomer can be used in an amount defined above to provide the particulate material with an enhanced physical strength and hence an enhanced stability.

Examples of the initiator to be used in the foregoing polymerization method include the following substantially water-insoluble or difficultly water-soluble compounds. The use of a water-soluble initiator causes emulsion polymerization reaction, resulting in the formation of fine particles having a diameter of not more than 1 μm. Thus, such a water-soluble initiator is not suitable for the preparation of the particulate adhesive colored resin of the present invention.

Examples of the initiator employable herein include organic peroxides such as benzoyl peroxide, t-butyl benzoate, lauroyl peroxide, m-toluyl peroxide, t-butyl peroxypivalate, cumyl peroxy neodecanoate, octanoyl peroxide, decanoyl peroxide and t-butyl peroxy isopropyl carbonate, azo compounds such as 2,2'-azobisisobutyronitrile, 2,2'-azobis (2,4-dimethylvaleronitrile), 2,2'-azobispropionitrile, 2,2'-azobisvaleronitrile and 1,1'-azobis(cyclohexane-1-carbonitrile), and other ordinary free radical-generating compounds.

The method for obtaining the particulate adhesive colored resin by suspension polycondensation or suspension addition reaction will be further described hereinafter. In the former method, a reactive monomer, oligomer or prepolymer can be used. As such a compound there may be used a resin selected from the group consisting of acrylic resin, acryl polyol, epoxy resin, urethane resin, acrylurethane resin and silicone resin which becomes adhesive after reacted. In some detail, a pigment is dispersed in a solution containing the foregoing reactive resin. A crosslinking agent is further added to the dispersion as necessary. The dispersion is then emulsified in a dispersant containing a dispersing agent to a desired particle diameter. Thereafter, the reaction temperature is raised to accelerate the reaction. In this manner, the desired particulate adhesive colored resin can be obtained.

Referring to the method for obtaining the particulate adhesive colored resin by submerged solvent evaporation, a pigment is uniformly dispersed in a solution of a polymer having an adhesivity in a water-insoluble solvent. The dispersion is then emulsified in a dispersant containing a hydrophilic dispersing agent to a desired particle diameter. Thereafter, the evaporation can be distilled off under heating or reduced pressure to obtain the desired particulate adhesive colored resin. If necessary, a crosslinking agent is added to the material before or after emulsification to modify the physical properties of the original polymer. The polymer to be used in the submerged solvent evaporation method is not specifically limited so far as it is adhesive. In practice, however, any of acrylic acid ester resins, acryl styrene copolymer resins, acrylic acid ester copolymer resins, methacrylic acid ester resins, methacrylic acid ester copolymer resins, ethylene-vinyl acetate resins, ethylene-acryl copolymer resins, vinyl acetate resins, polyester resins and alkyd resins may be used.

The emulsification in the foregoing submerged solvent evaporation method may be accomplished by phase reversion method.

Referring to the adjustment of the adhesivity of the particulate adhesive colored resin of the present invention, a resin having a desired viscosity can be obtained by (1) changing the kind of monomers having a latent adhesivity or mixing these monomers to obtain a desired adhesive resin or (2) adjusting the amount of polyfunctional monomer (crosslinking monomer). In order to further adjust the adhesivity of the particulate adhesive colored resin, a tackifier such as rosin, rosin derivative, coumarone-indene resin, polyterpene resin, nonreactive phenol resin and petroleum hydrocarbon resin may be added. Alternatively, a plasticizer such as mineral oil, liquid polybutene, lanolin and dibasic acid ester, a pigment or an extender pigment may be properly added.

The particulate adhesive colored resin may includes a pigment incorporated therein as a coloring means. This is because a dye is disadvantageous in that if used as a coloring agent, it moves from the particulate adhesive colored resin to paper, giving stain that cannot be erased even with an eraser.

Referring to the method for coloring the particulate adhesive resin, the pigment is dispersed in a monomer, oligomer, prepolymer or polymer in the presence of a dispersing agent optionally with a solvent added thereto. Thereafter, various particulate adhesive colored resins including a pigment incorporated therein are prepared according to various reaction processes. The pigment may be uniformly dispersed in the particulate material or may be unevenly localized in the particulate material.

Examples of the foregoing pigment include organic pigments such as azo pigment, anthraquinone pigment, condensed polyazo pigment, thioindigo pigment, metal complex pigment, phthalocyanine pigment, perynone pigment, perylene pigment, dioxazine pigment and quinacridone pigment, and inorganic pigments such as carbon black, aniline black, ultramarine, chrome yellow pigment, titanium oxide and iron oxide. These pigments may be properly used singly or in admixture as necessary. Further, as a special pigment there may be used a fluorescent pigment, metal powder pigment, pearl pigment, light-storing pigment, reversibly heat-decolorable pigment, electrically-conductive pigment or the like. The foregoing pigments may be subjected to surface treatment by a known method for the purpose of enhancing the dispersibility in the solution of monomer or the like.

The foregoing particulate adhesive colored resin is preferably incorporated in an amount of from 5 to 35% by weight based on the ink composition. If the amount of the particulate adhesive colored resin falls below 5% by weight, a good color density cannot be obtained. On the contrary, if the amount of the particulate adhesive colored resin exceeds 35% by weight, the proportion of solid content in the ink composition is raised, occasionally preventing smooth discharge of ink. Accordingly, the added amount of the particulate adhesive colored resin can be properly determined within the above defined range depending on the desired color density or purpose of the particulate adhesive colored resin itself.

Two or more such particulate adhesive colored resins having different adhesivities, color tones, color densities and particle diameter distributions may be used in admixture as necessary.

Further, the proportion of the pigment in the particulate adhesive colored resin is preferably from 2 to 30% by weight.

In particular, a particulate adhesive colored resin having a pigment homogeneously dispersed therein can be hardly adjusted particularly in its particle diameter if the pigment content exceeds 30% by weight. On the contrary, if the pigment content falls below 2% by weight, a writing showing a good color density can be hardly obtained. For a heterogeneous particulate adhesive colored resin, too, the same conditions can be used during the preparation of primary particles.

Further, the ink composition of the present invention may includes a nonadhesive particulate colored material having the same particle diameter distribution as the particulate adhesive colored resin for the purpose of giving complementary colors or adjusting adhesivity. Such a nonadhesive particulate colored material may be incorporated in a weight proportion of not more than 40 per 100 of the particulate adhesive colored resin as necessary.

The foregoing rubber-erasable aqueous ink for a writing material composition includes a particulate thermoplastic resin incorporated therein having the particle diameter distribution such that the amount of particles having a particle diameter of from 2 $\mu$m to 20 $\mu$m is not less than 70% by weight of all the particles In this arrangement, the resulting writing, when heated by a heating machine such as iron or under a heat roller as in copying machine, can be provided with a permanent fixability such that it cannot be erased even when rubbed with eraser or finger.

The particulate thermoplastic resin will be further described hereinafter.

Specific examples of the resin constituting the foregoing particulate thermoplastic resin include thermoplastic resins such as styrene resin, acrylic resin, epoxy resin, polyester resin, styrene-acryl copolymer resin, polyvinyl chloride resin, polyamide, urethane resin, polymethyl methacrylate, polyol resin, acryl-urethane copolymer, phenolic resin, polyethylene, polyacrylonitrile, styrene-butadiene copolymer and acrylonitrile-butadiene copolymer. The resin constituting the foregoing particulate thermoplastic resin is limited to these compounds. Any compounds which can be used as resin component for electrophotographic toner may be used.

The preparation of the foregoing particulate thermoplastic resin can be accomplished by any known method for the preparation of electrophotographic toner such as grinding method and polymerization method.

In order to obtain the particulate thermoplastic resin of the present invention having a particle diameter distribution such that the amount of particles having a particle diameter of from 2 $\mu$m to 20 $\mu$m is not less than 70% by weight of all the particles, grinding method, suspension polymerization method or dispersion polymerization method may be preferably used. Emulsion polymerization method causes the formation of fine particles having a particle diameter distribution such that most of the particles have a particle diameter of not more than 1 $\mu$m and thus is not appropriate for the preparation of the particulate resin of the present invention.

The particulate thermoplastic resin may be colored with the foregoing pigment to enhance the density of the writing. Alternatively, a particulate thermoplastic resin which has been separately colored may be added to the particulate thermoplastic resin to enhance the density and fixability of the writing.

Referring to desirable thermal properties of the particulate thermoplastic resin, the particulate thermoplastic resin exhibits a softening point of from 60° C. to 180° C. and a melt flow index (MI) of from 0.1 to 30, preferably from 0.1 to 20.

The preparation of the particulate thermoplastic resin by polymerization method will be described hereinafter.

The foregoing particulate thermoplastic resin is preferably prepared by subjecting a radical-polymerizable monomer to at least one polymerization selected from the group consisting of suspension polymerization, dispersion polymerization and seed polymerization.

The reactive monomers and radical initiators to be used in the preparation of the foregoing thermoplastic resin by radical polymerization such as suspension polymerization, seed polymerization and dispersion polymerization may be selected from the previously mentioned starting materials from which the particulate adhesive colored resin is prepared.

The preparation of the particulate thermoplastic resin by grinding method can be accomplished by a process including melt-mixing the foregoing thermoplastic resin over a heat roll or extruder, coarsely processing the material into chip, and then atomizing the chip by means of a grinder.

More particularly, a known method for the preparation of ground electrophotographic toner may be used.

The foregoing particulate thermoplastic resin can be adjusted by wet classification method or dry classification method to have a desired particle diameter distribution.

As the wet or dry classification method there may be used one described above.

The content and weight proportion of the particulate adhesive colored resin and the particulate thermoplastic resin to be incorporated in the ink composition will be further described hereinafter.

Referring to the content of each of these particulate materials in the ink composition, it is preferred that the content of the particulate adhesive colored resin and the particulate thermoplastic resin be from 5 to 30% by weight and from 1 to 15% by weight, respectively, and the weight ratio of the particulate thermoplastic resin to the particulate adhesive colored resin is from 2:100 to 50:100.

If the content of the particulate adhesive colored resin falls below 5% by weight, neither a good color density nor a good fretting resistance can be obtained. On the contrary, if the content of the particulate adhesive colored resin exceeds 30% by weight, the proportion of solid content in the ink composition is raised, occasionally preventing smooth discharge of ink.

If the content of the particulate thermoplastic resin falls below 1% by weight, a good heat-fixability cannot be obtained. On the contrary, if the content of the particulate thermoplastic resin exceeds 15% by weight, the resulting fretting resistance can be deteriorated. Further, if the mixing ratio of the particulate thermoplastic resin to the particulate adhesive colored resin falls below 2, a good heat-fixability cannot be obtained. On the contrary, if the mixing ratio of the particulate thermoplastic resin to the particulate adhesive colored resin exceeds 50, the resulting fretting resistance can be deteriorated.

As second aspect of the present invention, the rubber-erasable aqueous ink for a writing material composition will be further described, including at least a particulate colored resin containing a pigment, a particulate adhesive resin, water, and a water-soluble polar solvent, the particulate colored resin and particulate adhesive resin each having a particle diameter distribution such that the amount of particles having a particle diameter of from 2 $\mu$m to 20 $\mu$m is not less than 70% by weight of all the particles.

The foregoing particulate colored resin is a particulate material which can be colored to give a visible writing. Further, the foregoing particulate colored resin needs to have a particle diameter distribution such that the amount of particles having a particle diameter of from 2 µm to 20 µm is not less than 70% by weight of all the particles to prevent the penetration into paper.

The foregoing particulate colored resin may be a particulate colored resin having a pigment homogeneously dispersed in a particulate resin or a particulate colored resin having a particulate resin covered by a pigment.

Examples of the resin constituting the foregoing particulate colored resin include polystyrene, acrylic resin, epoxy resin, melamine resin, polyester, polyvinyl chloride, benzoguanamine resin, polyamide, urethane resin, polymethyl methacrylate, acryl-urethane copolymer, phenolic resin, polyethylene, polyacrylonitrile, styrene-acryl copolymer, styrene-butadiene copolymer, and acrylonitrile-butadiene copolymer.

As the pigment for coloring the foregoing resin there may be used one previously mentioned.

The foregoing particulate colored resin can be obtained by using any known preparation method such as grinding method, polymerization method and spray dry method. Specific examples of the foregoing polymerization method include suspension polymerization method, suspension polycondensation method, dispersion polymerization method, and emulsion polymerization method. Microcapsulization method may be used.

In order to obtain a particulate colored material of the present invention having a particle diameter distribution such that most of the particles have a particle diameter of from 2 µm to 20 µm, grinding method, suspension polymerization method, suspension polycondensation method or dispersion polymerization method may be preferably used. Particularly preferred among these polymerization methods are suspension polymerization method and grinding method.

Emulsion polymerization method causes the formation of fine particles having a particle diameter distribution such that most of the particles have a particle diameter of not more than 1 µm and thus is not appropriate for the preparation of the particulate resin of the present invention.

As the foregoing particulate colored resin there may be used a commercially available product. Examples of the commercially available product employable herein include Technopolymer MBX-5 (trade name of particulate colored resin produced by Sekisui Plastic Co., Ltd.) and Art Pearl C-800 (trade name of particulate colored resin produced by Negami Chemical Industrial Co., Ltd.).

As the particulate colored resin there may also be used a microcapsuled pigment obtained by capsulating or solid-dissolving a colored material having a pigment dispersed in a medium in a shell made of a resin wall membrane material by microcapsulizing method.

Examples of the wall membrane material constituting the shell include gelatin, shellac, gum arabic, rosin, rosin ester, ethyl cellulose, carboxymethyl cellulose, paraffin, tristearin, polyvinyl alcohol, polyethylene, polypropylene, acrylic resin, vinyl resin, polyisobutene, polyurethane, polybutadiene, polyester, polyamide, epoxy resin, phenolic resin, silicone resin, polystyrene, and melamine resin. These wall membrane materials may be used singly or in admixture.

Examples of the microcapsulization method employable herein include coacervation method, in-situ polymerization method, interfacial polymerization method, submerged film curing method, method involving the phase separation from an aqueous solution, method involving the phase separation from an organic solvent, melt dispersion cooling method, air suspension coating method, and spray drying method.

If the foregoing particulate colored resin is a particulate thermoplastic colored resin, the resulting writing, when heated by a heating means such as iron or under a heat roller as in copying machine, can be provided with a permanent fixability such that it cannot be erased even when rubbed with an eraser or finger.

The foregoing particulate thermoplastic colored resin may be a particulate colored resin having a pigment homogeneously dispersed in a particulate thermoplastic resin or a particulate colored resin having a particulate thermoplastic resin covered by a pigment.

As the resin to be incorporated in the foregoing particulate thermoplastic colored resin there may be used one to be used in the foregoing particulate thermoplastic resin.

The foregoing particulate thermoplastic colored resin can be obtained by using any known method for the preparation of electrophotographic toner such as grinding method, polymerization method and spray dry method.

Specific examples of the foregoing polymerization method include suspension polymerization method, suspension polycondensation method, dispersion polymerization method, and microcapsulization method.

In order to obtain the particulate thermoplastic colored resin of the present invention having a particle diameter distribution such that the amount of particles having a particle diameter of from 2 µm to 20 µm is not less than 70% by weight of all the particles, grinding method, suspension polymerization method or dispersion polymerization method may be preferably used. Emulsion polymerization method causes the formation of fine particles having a particle diameter distribution such that most of the particles have a particle diameter of not more than 1 µm and thus is not appropriate for the preparation of the particulate resin of the present invention.

The thermal properties of the particulate thermoplastic colored resin will be further described hereinafter.

The thermoplastic resin to be incorporated in the foregoing particulate thermoplastic colored resin or the particulate thermoplastic colored resin itself exhibits a softening point of from 60° C. to 180° C. and a melt flow index (MI) of from 0.1 to 30.0, preferably from 0.1 to 20, in order that the resulting writing, when heated, can be rendered resistant to erasure by an eraser. The foregoing softening point, MI and heat-fusibility are closely related to each other. If the softening point falls below 60° C., the writing can be transferred to another sheet of paper which has been laminated thereon or causes the two sheets of paper to be glued (blocking). On the contrary, if the softening point exceeds 180° C., it requires the use of a high temperature heating means or heat roller that can deteriorated the quality of paper. Further, if MI falls below 0.1, the resulting thermoplastic resin exhibits too small a fluidity during heating to obtain a sufficient fixability. On the contrary, if MI exceeds 30, the resulting writing can be transferred to the foregoing heating means to thin the writing or stain the heating means. Further, when heated, the thermoplastic resin can easily penetrate into paper, deteriorating the fixability or impairing the sharpness of the writing.

The foregoing softening point can be measured by a ring and ball softening point measuring method according to JIS K2531. MI can be measured by A method according to JIS K7210. These measurements are effected at a temperature of 125° C. under a load of 10 kg.

As the reactive monomer and radical initiator to be used in the preparation of the foregoing particulate thermoplastic colored resin by a suspension polymerization method involving radical polymerization there may be used the previously mentioned starting materials from the particulate adhesive colored resin is prepared.

The weight proportion of the pigment and thermoplastic resin constituting the particulate thermoplastic colored resin will be further described hereinafter.

Referring to the weight ratio of the pigment and thermoplastic resin constituting the particulate thermoplastic colored resin, the proportion of the thermoplastic resin is preferably from 2 to 40 per 1 of the pigment. If the proportion of the thermoplastic resin falls below 2, the resulting particulate thermoplastic colored resin doesn't exhibit a good fixability. On the contrary, if the proportion of the thermoplastic resin exceeds 40, the resulting color density is lowered, making it difficult to obtain a writing showing a good color density.

The particulate adhesive resin to be incorporated in the ink composition in combination with the foregoing particulate colored resin or thermoplastic colored resin will be further described hereinafter.

The foregoing particulate adhesive resin acts to bond the foregoing particulate colored resin or particulate thermoplastic colored resin which is not adhesive to paper to paper, rendering the writing resistant to fretting as well as erasable by an eraser. The adhesivity of the particulate adhesive resin itself and the content of the particulate adhesive resin in the ink composition are determined within a good range such that the desired rubber-erasability and fretting resistance can be satisfied. The particulate adhesive resin, too, needs to have a particle diameter distribution such that the amount of particles having a particle diameter of from 2 $\mu$m to 20 $\mu$m is not less than 70% by weight of all the particles to prevent or lessen its penetration into paper.

The process for the preparation of the foregoing particulate adhesive resin is not specifically limited so far as it is adhesive at least on the surface layer thereof. Any known method for the synthesis of particulate resin may be used.

Examples of the form of the particulate adhesive resin include a structure wherein the entire resin constituting the particulate adhesive resin is a homogeneous polymer composition having an adhesivity, a structure including a particulate adhesive resin the surface of which is entirely coated with a polymer composition having an adhesivity, a structure including a multi-layer particulate adhesive resin at least surface of which is adhesive, and a structure including a particulate adhesive resin a part of the surface of which is formed by a polymer composition having a continuous or discontinuous adhesivity.

The foregoing particulate adhesive resin can be obtained by suspension polymerization method, suspension polycondensation method, suspension addition reaction method, seed polymerization method, dispersion polymerization method, submerged solvent evaporation method or the like. In order to obtain the structure wherein the entire resin constituting the particulate adhesive resin is a homogeneous polymer composition having an adhesivity, suspension polymerization method, dispersion polymerization method, seed polymerization method or submerged solvent evaporation method may be mainly used. on the other hand, in order to obtain the structure including a multi-layer particulate adhesive resin at least surface of which is adhesive, suspension polymerization method, suspension polycondensation method, suspension addition reaction method, seed polymerization method, dispersion polymerization method and submerged solvent evaporation method can be used in proper combination. Alternatively, a secondary surface modification method can be used. As the foregoing multi-layer particulate adhesive resin there may be used one which is hard in the center thereof but adhesive on the surface layer thereof.

The foregoing secondary treatment is a treatment which includes modifying primary particles obtained so that they are rendered adhesive regardless of whether or they are adhesive.

The preparation of the particulate adhesive resin is preferably accomplished by at least one polymerization method selected from the group consisting of suspension polymerization method, dispersion polymerization method and seed polymerization method, more preferably seed polymerization method or dispersion polymerization method. These polymerization methods can provide a particulate material showing a sharp (acute) particle diameter distribution curve (particulate material having a sharp particle diameter distribution). Thus, classification following the reaction can be substantially omitted.

The adhesive properties of the foregoing particulate adhesive resin are meant to indicate that the particulate material itself can be erased by an eraser but exhibits the lowest required adhesivity with respect to light fretting. In other words, if the particulate adhesive resin exhibits too strong an adhesivity, it can be less erased by an eraser or cannot be fairly erased unless rubbed by an eraser with a strong frictional force. On the contrary, if the particulate adhesive resin exhibits too weak an adhesivity, it can be easily peeled even when lightly rubbed. Accordingly, the adhesivity of the particulate adhesive resin needs to be adjusted such that a good rubber-erasability and a high fretting resistance can be attained at the same time.

As an index for providing the particulate adhesive resin with a proper adhesivity, it is preferred that the particulate adhesive resin thus obtained exhibit a glass transition point of lower than 40° C., more preferably lower than 20° C. If the adhesive resin used exhibits a glass transition point of not lower than 40° C., the resulting writing exhibits a weak adhesivity at room temperature and thus cannot attain a desired fretting resistance.

The polymer to be used in the preparation of the foregoing particulate adhesive resin is not specifically limited so far as it is adhesive. The same polymer as used in the particulate adhesive colored resin can be used.

The reactive monomers and radical initiators to be used in the preparation of the foregoing particulate adhesive resin by radical polymerization such as suspension polymerization, seed polymerization and dispersion polymerization may be selected from the previously mentioned starting materials from which the particulate colored resin is prepared.

As the method for preparing the foregoing particulate adhesive resin by suspension polycondensation method, suspension addition reaction method or submerged solvent evaporation method there may be used the same method as mentioned above.

As the method for adjusting the adhesivity of the foregoing particulate adhesive resin there may be used the same method as used for the particulate adhesive colored resin.

The method for adjusting the particle diameter distribution of the particulate colored resin and the particulate adhesive resin as mentioned above will be further described hereinafter.

The foregoing particulate colored resin and particulate adhesive resin can be adjusted to have a desired particle diameter distribution by wet or dry classification method.

The wet or dry classification method can be accomplished by the foregoing method.

However, the foregoing particulate adhesive resin stays adhesive at room temperature and thus can be adjusted by the same method for the adjustment of the particle diameter distribution of the foregoing particulate adhesive colored resin.

The content and weight proportion of the particulate colored resin and the particulate adhesive resin to be incorporated in the ink composition will be further described hereinafter.

Referring to the content of each of these particulate materials in the ink composition, it is preferred that the content of the particulate colored resin and the particulate adhesive resin be from 5 to 30% by weight and from 0.5 to 15% by weight, respectively, and the weight ratio of the particulate adhesive resin to the particulate colored resin is from 2:100 to 200:100, preferably from 5:100 to 150:100.

If the content of the particulate colored resin falls below 5% by weight, a good color density cannot be obtained. On the contrary, if the content of the particulate adhesive resin exceeds 30% by weight, the proportion of solid content in the ink composition is raised, occasionally preventing smooth discharge of ink. Also in the case where the particulate thermoplastic colored resin is used, the same content and weight proportion as for the particulate colored resin is preferred.

If the content of the particulate adhesive resin falls below 0.5% by weight, a good fretting resistance cannot be obtained. On the contrary, if the content of the particulate adhesive resin exceeds 15% by weight, it is occasionally difficult to obtain a good rubber-erasability. Further, if the ratio of the particulate adhesive resin to the particulate colored resin falls below 2, a good fretting resistance cannot be obtained. On the contrary, if the ratio of the particulate adhesive resin to the particulate colored resin exceeds 200, a good rubber-erasability can hardly be obtained.

Figure 2:
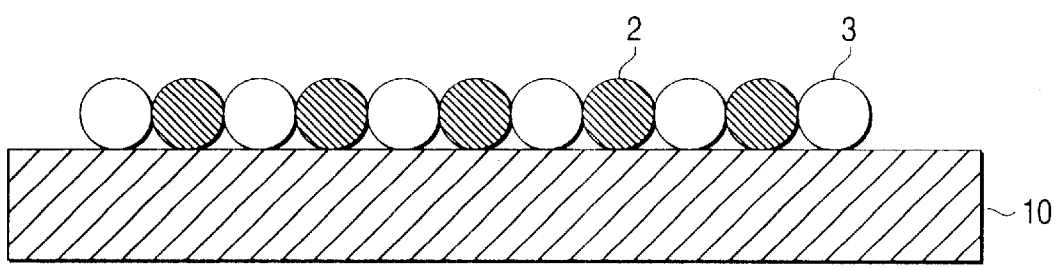
FIG. 2 is an enlarged vertical section of writing formed by the rubber-erasable aqueous ink for a writing material composition of the present invention including a particulate colored resin and a particulate adhesive resin incorporated therein.

Referring to the configurational characteristics of the writing formed on paper by the foregoing rubber-erasable aqueous ink for a writing material composition, the dried writing formed on paper by an ink composition including the foregoing particulate colored resin 2 and particulate adhesive resin 3 includes particles point-bonded to each other and to the surface of paper 10 as shown in FIG. 2. In this arrangement, a two-dimensional network with a particulate adhesive resin 3 as a nucleus is continuously or discontinuously formed on the surface of paper 10. The foregoing configurational characteristics provide a good rubber-erasability and a good fretting resistance at the same time.

Figure 3:
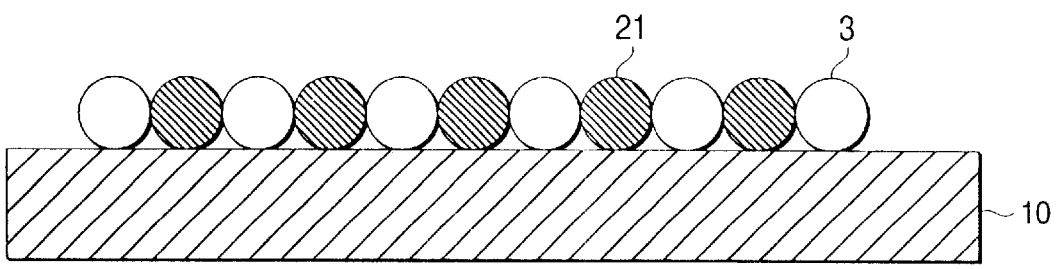
FIG. 3 is an enlarged vertical section of writing formed by the rubber-erasable aqueous ink for a writing material composition of the present invention including a particulate thermoplastic colored resin and a particulate adhesive resin incorporated therein.

Further, in the writing formed by the ink composition including the particulate thermoplastic colored resin and the particulate adhesive resin, the particulate adhesive resin 3 is point-bonded to the particulate thermoplastic colored resin 21 and to the surface of paper 10 with an adhesivity as shown in FIG. 3. In this arrangement, a two-dimensional network with a particulate adhesive resin 3 as a nucleus is continuously or discontinuously formed on the surface of paper 10.

Figure 4:
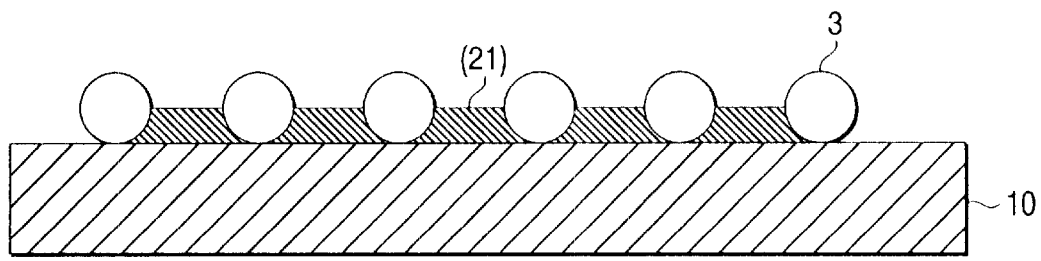
FIG. 4 is an enlarged vertical section illustrating the writing of FIG. 3 which has been subjected to heat treatment.

Further, when the writing thus formed is subjected to heat treatment, the particulate thermoplastic colored resin 21 melts to show a deformation from the original independent particle, causing aggregation of all the particles in the writing. At the same time, the resin melts to penetrate into paper, providing the writing with a high fixability such that it cannot be erased even when rubbed with an eraser as shown in FIG. 4.

Figure 5:
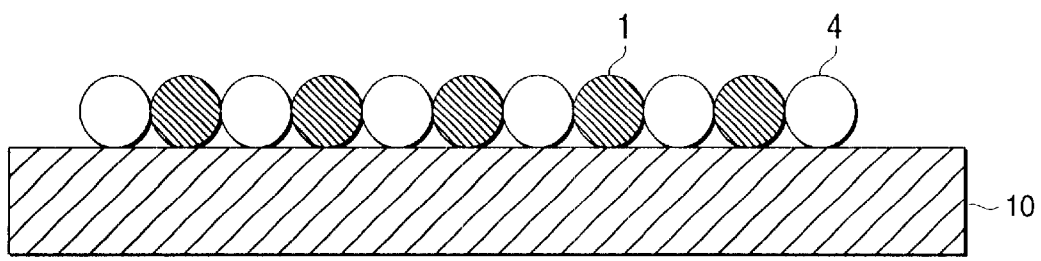
FIG. 5 is an enlarged vertical section of writing formed by the rubber-erasable aqueous ink for a writing material composition of the present invention including a particulate adhesive colored resin and a particulate thermoplastic resin incorporated therein.
Figure 6:
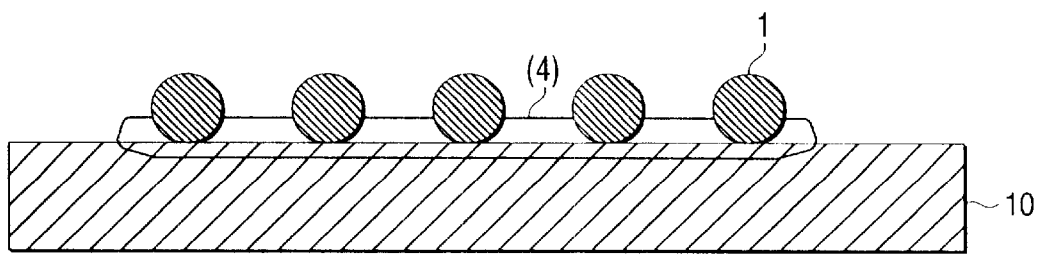
FIG. 6 is an enlarged vertical section illustrating the writing of FIG. 5 which has been subjected to heat treatment.

Further, in the writing formed by the ink composition including the particulate adhesive colored resin and the particulate thermoplastic resin, the particulate adhesive colored resin 1 is point-bonded to the surface of paper 10 and to the particulate thermoplastic resin 4 as shown in FIG. 5. In this arrangement, a network with resin particles point-bonded to each other is continuously or discontinuously formed on the surface of paper. When the writing thus formed is subjected to heat treatment, the particulate thermoplastic resin 4 melts to show a deformation, causing aggregation of all the particles 1 in the writing. At the same time, the resin melts to penetrate into paper 10, exerting an enhanced effect f bonding to paper and hence providing the writing with a high fixability such that it cannot be erased even when rubbed with an eraser as shown in FIG. 6.

The preparation of the ink composition can be accomplished by homogeneously dispersing the foregoing various particulate materials in a vehicle containing water and a water-soluble polar solvent.

The foregoing water-soluble polar solvent is used for the purpose of inhibiting the drying of the ink at the tip of writing materials, rendering the writing water-resistant or like purposes. As the water-soluble polar solvent there may be effectively used any general-purpose solvent compatible with water. For example, polyvalent alcohols such as ethylene glycol, diethylene glycol, triethylene glycol, 1,3-propanediol, propylene glycol, butylene glycol, dipropylene glycol, thiodiethylene glycol, sorbitol, glycerin and polyethylene glycol, ethylene glycol monomethyl ether, diethylene glycol monomethyl ether, triethanolamine, 2-pyrrolidone, N-methyl-2-pyrrolidone, dimethylformamide, etc. may be used singly or in combination. The amount of the water-soluble polar solvent to be added is preferably from 2 to 35% by weight based on the weight of the ink composition.

The ink composition of the present invention may includes general-purpose additives such as preservative, anti-foaming agent, oxidation inhibitor, stabilizer, pH adjuster and surfactant incorporated therein as necessary.

Referring to the foregoing additives, as the pH adjuster here may be used an inorganic salt such as sodium carbonate, sodium phosphate and sodium acetate or an organic basic compound such as water-soluble amine compound. As the rust preventive there may be used benzotriazole, tolyl triazole, dicyclohexyl ammonium nitrite, diisopropyl ammonium nitrite, saponin or the like.

As the preservative or mildew-proofing agent there may be used carbolic acid, sodium salt of 1,2-benzthiazoline-3-on, sodiumbenzoate, sodiumdehydroacetate, potassiumsorbate, propyl paraoxybenzoate, 2,3,5,6-tetrachloro-4-(methylsulfonyl)pyridine or the like.

As the wetting agent there may be used urea, nonionic surfactant, sorbit, mannitol, sucrose, dextrose, reduced starch hydrolyzate, sodium pyrophosphate or the like. Further, a fluorine-based surfactant or silicone-based, nonionic, anionic or cationic surfactant may be used as an ink penetration improver. An anti-foaming agent or dispersing agent such as dimethyl polysiloxane may be used.

The foregoing additives are so-called general-purpose additives. These additives may be properly selected from the group consisting of known compounds as necessary.

Further, the aqueous vehicle medium may include a known water-soluble resin or aqueous resin emulsion incorporated therein for the purpose of enhancing the fluidity of the ink, stabilizing the dispersibility of the ink and closely adjusting the adhesivity of the ink.

Writing materials including the foregoing rubber-erasable aqueous ink for a writing material composition incorporated therein will be described hereinafter.

The writing materials including the foregoing rubber-erasable aqueous ink for a writing material composition incorporated therein may be a marking pen having a structure arranged to supply the ink into the tip of the writing materials on which a fiber chip, felt chip or plastic chip is mounted from an ink occluding material made of a bundle of fibers received in a cylindrical holder, the ink occluding material impregnated with the ink, a structure having the ink directly received in a cylindrical holder with a pectinated ink flow adjusting member or an ink flow adjusting member made of a bundle of fibers being interposed therebetween, or a structure having the ink directly received in a cylindrical holder having a valve mechanism arranged to supply a predetermined amount of the ink into the tip of the writing materials.

On the other hand, when the ink composition of the present invention is used for ball point pen, the particulate material tends to undergo sedimentation in the ink composition because the particulate material used have a relatively great particle diameter. For this reason, the ink composition may include a shear-thinning agent incorporated therein. If the resulting ink composition exhibits a viscosity of from 25 to 160 mPa·s as determined at 25° C. and 100 rpm by means of an EMD type viscometer and a shear-thinning index of from 0.1 to 0.7 at 100 rpm, writing materials which are free from sedimentation and separation of particulate material and thus are stable with time can be obtained.

If the ink viscosity at 100 rpm exceeds 160 mPa·s, the resulting ink dischargeability is deteriorated, disabling writing or causing blurring. On the contrary, if the ink viscosity at 100 rpm falls below 25 mPa·s, the dispersion stability of the particulate material cannot be sufficiently maintained. In other words, if the shear-thinning index falls outside the above defined range, the resulting effect is not optimum, impairing the effect of inhibiting the separation of the particulate adhesive colored resin, the ink dischargeability and the writing performance.

The shear-thinning index of the ink as used hereinabove is n value obtained by substituting for an experimental formula ($T=Kj^n$ where K and n are calculated constants) obtained from rheological measurements made by a viscometer such as shear stress (T) and shear rate (j).

As the foregoing shear-thinning agent there may be used any compound known as such. Examples of the shear-thinning agent employable herein include xanthan gum, welan gum, succinoglycan composed of organic acid-modified heteropolysaccharide as monosaccharide (average molecular weight: about 1,000,000 to 8,000,000), gua gum, locust bean gum and derivative thereof, hydroxyethyl cellulose, alginic acid alkyl ester, polymer having a molecular weight of from 100,000 to 150,000 mainly composed of methacrylic acid alkyl ester, glycomannan, gelatinizable hydrocarbon extracted from seaweeds such as agar and carrageenan, benzylidene sorbitol and benzylidene xylitol or derivative thereof, and crosslinkable acrylic acid polymer. These shear-thinning agents may be used singly or in admixture.

Further examples of the shear-thinning agent employable herein include nonionic surfactants having HLB value of from 8 to 12 selected from the group consisting of polyglycerinaliphatic acid esters, polyoxyethylenesorbitan aliphatic acid esters, polyoxyethylenecastor oils, polyoxyethylenelanolin, lanolinalcohol, beeswax derivatives, polyoxyethylene alkyl ethers, polyoxypropylene alkyl ethers, polyoxyethylene alkyl phenyl ethers and aliphatic acid amides, neutralization product of dialkyl or dialkenylsulfosuccinic acid, mixture of N-alkyl-2-pyrrolidone and anionic surfactant, and mixture of polyvinyl alcohol and acrylic resin. These shear-thinning agents may be used singly or in admixture.

The foregoing shear-thinning agent may be used in an amount of from 0.1 to 20% by weight based on the weight of the ink composition.

Referring next to the particle diameter of the particulate material to be incorporated in the rubber-erasable aqueous ink for a writing material composition for ball point pen, it is preferred that the entire particulate material incorporated in the ink composition have a particle diameter distribution such that the amount of particles having a particle diameter of from 2 $\mu$m to 10 $\mu$m is not less than 80% by weight of all the particles, preferably such that a particle diameter distribution such that the amount of particles having a particle diameter of from 2 $\mu$m to 10 $\mu$m is not less than 90% by weight of all the particles.

The particle diameter distribution of the ink composition for ball point pen needs to be restricted more greatly than that of other writing materials to allow smooth passage of the particulate material through the narrow gap in the vicinity of the portion receiving ball at the tip of ball point pen. Though depending on the structure of ball point pen, a particulate material is preferably used having a particle diameter distribution such that the amount of particles having a particle diameter of from 2 $\mu$m to 10 $\mu$m is not less than 80% by weight of all the particles. More preferably, a particulate material is used having a particle diameter distribution such that the amount of particles having a particle diameter of from 2 $\mu$m to 10 $\mu$m is not less than 90% by weight of all the particles. If the proportion of particles having a particle diameter of not less than 10 $\mu$m is too great, coarse particles don't pass and thus are accumulated in the vicinity of the foregoing ball-receiving portion, disabling writing.

The particulate adhesive colored resin or the stabilizer for particulate adhesive resin to be used in the preparation of the rubber-erasable aqueous ink for a writing material composition for ball point pen will be further described hereinafter.

As the ball rotates during writing, the foregoing particulate adhesive resin material tends to aggregate or conglomerate to each other under the action of extreme pressure in the vicinity of the ball-receiving portion. Therefore, it is preferred that the ink composition include a particulate adhesive material incorporated therein.

As the foregoing stabilizer there may be used an anionic surfactant or amphoteric surfactant. Preferably, an amphoteric surfactant is used singly or in combination with an anionic surfactant. The stabilizer is oriented on the surface of the particulate adhesive material to exert a remarkable effect of inhibiting the aggregation or conglomeration of the adhesive material particles in the vicinity of the ball-receiving portion.

As the foregoing anionic surfactant to be used herein there may be used alkyl sulfate, polyoxyethylenealkylethersulfate, sulfosuccinate, sulfonate, taurin derivative, sarcosine derivative, amide ether sulfate, alkyl phosphate, polyoxyethylenealkyletherphosphate, aliphatic acid salt, alkyl ether aliphatic acid salt or the like. Examples of these anionic surfactants include sodium laurylsulfate, triethanolamine laurylsulfate, sodium myristylsulfate, sodium polyoxyethylenelaurylethersulfate, triethanolamine polyoxyethylenelaurylethersulfate, dioctylsodium sulfosuccinate, sodium laurylsulfoacetate, N-lauroyl-methyltaurinsodium, N-myristoylmethyltaurin triethanolamine, lauroylsarcosinesodium, oleylsarcosinepotassium, myristoylsarcosinesodium, sodium sulfate of polyoxy palm oil aliphatic acid monoethanolamide, sodium laurylphosphate, sodium polyoxyethylenecetyl etherphosphate, triethanolamine polyoxyethylenenonylphenyl etherphosphate, triethanolamine dipolyoxyethylenelaurylether phosphate, triethanolamine tripolyoxyethylenelaurylether phosphate, triethanolamine of palm oil aliphatic acid, and sodium polyoxyethylenelauryletheracetate.

As the foregoing amphoteric surfactant there may be used an alkylbetain type, alkylaminobetain type, imidazoline type, glycin type or etheraminoxide type surfactant. Examples of these amphoteric surfactants include betain lauryldimethylaminoacetate, amidepropyldimethylamino acid betain of palm oil aliphatic acid, amidepropylbetain laurate, 2-alkyl-N-carboxymethyl-N-hydroxyethylimidazoliniumbetain, laurylhydroxysulfobetain, polyoctylpolyaminoethylglycin, lauryldimethylaminoxide, and alkyldimethylaminoxide of polyoxyethylene palm oil.

The structure and shape of ball point pen itself are not specifically limited. General-purpose structures and shapes which have been heretofore known may be used. For example, a ball point pen can be exemplified having. a structure including an ink receiving tube having a cylindrical holder filled with an ink composition, the ink receiving tube communicating to the tip in which a ball is mounted, a follower being mounted close to the end face of the ink composition.

Referring further to the foregoing ball point pen filled with an ink composition, the conventional general-purpose mechanism is useful as the structure of the tip thereof. Examples of such a mechanism employable herein include a tip having a ball held in a ball-holding portion formed by externally pressure-deforming a metallic pipe inward in the vicinity of the tip thereof, a tip having a ball held in a ball-holding portion formed by drilling or otherwise cutting a metallic material, and a tip formed by cutting a metallic pipe or metallic material having a ball held energized by a spring therein.

The foregoing ball may be made of a material such as hard metal, stainless steel, ruby and ceramic having a diameter of from about 0.3 to 1.2 mm.

As the foregoing ink-receiving tube for receiving the ink composition there may be preferably used, e.g., a formed product made of a thermoplastic resin such as polyethylene, polypropylene and polyethylene terephthalate because it causes little evaporation of ink and can be easily produced.

The foregoing ink-receiving tube to be used herein preferably has an inner diameter of from 2.5 to 10 mm.

Further, the foregoing ink-receiving tube can be formed by a transparent, colored transparent or semitransparent material to allow the confirmation of the color or remaining amount of ink.

The foregoing ink-receiving tube may be directly connected to the tip. Alternatively, the foregoing ink-receiving tube and the tip may be connected to each other with a connecting member.

The foregoing ink-receiving tube may have a refill for ball point pen received in a cyclic holder. Alternatively, the ink may be directly received in a cylindrical holder having a tip mounted on the forward end thereof as an ink-receiving body.

The refill to be received in the cylindrical holder preferably has an inner diameter of from 2.5 to 5 mm. The cylindrical holder in which the ink is directly received preferably has an inner diameter of from 4 to 10 mm.

The foregoing ink-receiving tube in which the ink composition is directly received preferably has an ink follower packed at the rear end thereof.

As the foregoing ink follower there may be used either a liquid or solid material. As the foregoing liquid ink follower there may be used a nonvolatile medium such as polybutene and silicone oil. The foregoing medium may include silica, aluminum silicate or the like incorporated therein as necessary.

As the solid ink follower there may be used a formed resin material.

These liquid and solid ink follower may be used in combination.

The rubber-erasable aqueous ink for a writing material composition of the present invention can be prepared by adding a dispersion containing a particulate adhesive colored resin and optionally a particulate thermoplastic resin or a particulate colored resin or particulate thermoplastic colored resin and a particulate adhesive resin to a medium including water and a water-soluble polar solvent, adding proper additives, if any, to the mixture, and then stirring the mixture to make a dispersion. The rubber-erasable aqueous ink for a writing material composition thus prepared is then packed into writing materials in the form of ball point pen, marking pen such as magic pen and felt pen, fountain pen and writing brush for use.

EXAMPLES

The present invention will be further described in the following examples, but the present invention should not be construed as being limited thereto.

For the measurement of particle diameter distribution in the following examples, a laser diffraction type particle size distribution meter [SALD 1100, produced by Shimadzu Corp.] was used. For the measurement of glass transition temperature, a differential scanning calorimeter [DSC 8230L, produced by Rigaku Corp.] was used.

The figure used in mixing proportion indicates parts by weight.

Examples and comparative examples of the ink composition including a particulate adhesive colored resin of the present invention or the ink composition including a particulate colored resin and a particulate adhesive resin of the present invention will be described hereinafter.

Example 1

Preparation of Dispersion of Particulate Adhesive Colored Resin

Into a 2-literiter separable flask were charged 480.0 parts of water in which 20.0 parts of a polyvinyl alcohol [Gosenol GL-03, produced by The Nippon Synthetic Chemical Industry Co., Ltd.] were then dissolved to make a dispersant.

To the foregoing dispersant was then added a coloring composition consisting of 8.0 parts of carbon black (Printex L, produced by Degussa-Huls Japan Co., Ltd.), 46.0 parts of butyl acrylate, 46.0 parts of styrene and 2.0 parts of 2,2'-azobisisobutyronitrile. The mixture was then stirred at a high speed to make droplets having a particle diameter of about 7 $\mu$m. Stirring continued for 6 hours during which the reaction mixture was subjected to suspension polymerization at a temperature of 60° C.

The reaction solution was then allowed to cool to room temperature. In order to remove the polyvinyl alcohol from the dispersant, the reaction solution was washed with 600.0 parts of water, and then subjected to centrifugal separation to separate a particulate adhesive black material therefrom.

The slurry of particulate adhesive black material thus obtained was washed with 600.0 parts of water, and then again subjected to centrifugal separation to separate the particulate material therefrom. The particulate material was then adjusted with water to a solid content of 50% by weight to obtain a dispersion of particulate adhesive black resin A.

The particulate adhesive black resin constituting the dispersion A thus obtained exhibited a glass transition temperature of 8° C., an average particle diameter of 8.2 $\mu$m and a particle diameter distribution such that the amount of particles having a particle diameter of from 2 $\mu$m to 15 $\mu$m is not less than 92.5% by weight of all the particles.

| Preparation of rubber-erasable aqueous ink composition | |
|---|---|
| Dispersion of particulate adhesive black resin A | 40.0 |
| Ethylene glycol | 10.0 |
| Penetrating agent [Acetynol EH, produced by Kawaken Finechemical Co., Ltd.] | 0.3 |
| Water | 49.7 |
| Total | 100.0 |

The foregoing components were mixed, and then stirred by a disper until homogeneity was attained to obtain an ink composition.

The ink composition thus obtained exhibited a viscosity of 5.8 mPa·s (determined at 25° C. by an ELD type viscometer).

Example 2

Preparation of Dispersion of Particulate Adhesive Colored Resin

Into a 2-liter separable flask were charged 475.0 parts of water in which 25.0 parts of a polyvinyl alcohol [Gosenol GL-03, produced by The Nippon Synthetic Chemical Industry Co., Ltd.] were then dissolved to make a dispersant.

To the foregoing dispersant was then added a coloring composition consisting of 11 parts of a red organic pigment (CINQUASIA Scarlet RT-787-D, produced by Ciba Geigy Inc.), 80.1 parts of butyl acrylate, 3.6 parts of methyl methacrylate, 5.3 parts of ethylene glycol dimethacrylate and 2.0 parts of t-butyl peroxy pivalate. The mixture was then stirred at a high speed to make droplets having a particle diameter of about 5 $\mu$m. Stirring continued for 6 hours during which the reaction mixture was subjected to suspension polymerization at a temperature of 60° C.

The reaction solution was then allowed to cool to room temperature. The reaction solution was thoroughly washed in the same manner as in Example 1, and then subjected to centrifugal separation. The particulate material thus separated was then adjusted with water to a solid content of 50% by weight to obtain a dispersion of particulate adhesive red resin B.

The particulate adhesive red resin constituting the dispersion B thus obtained exhibited a glass transition temperature of −32° C., an average particle diameter of 5.8 $\mu$m and a particle diameter distribution such that the amount of particles having a particle diameter of from 2 $\mu$m to 15 $\mu$m is not less than 90.5% by weight of all the particles.

| Preparation of rubber-erasable aqueous ink composition | |
|---|---|
| Dispersion of particulate adhesive red resin B | 40.0 |
| Ethylene glycol | 8.0 |
| Silicone-modified anti-foaming agent | 0.1 |
| Preservative (Proxel XL-2, produced by Zeneca Corp.) | 0.1 |
| Succinoglycan (organic acid-modified heteropolysaccharide; average molecular weight: approx. 1,000,000 to 8,000,000) | 0.2 |
| Phosphoric acid ester-based surface active agent [Plysurf M208B, produced by Dai-ichi Kogyo Seiyaku Co., Ltd.] | 0.5 |
| Water | 51.1 |
| Total | 100.0 |

The foregoing components were mixed, and then stirred by a disper until homogeneity was attained to obtain an ink composition.

The ink composition thus obtained exhibited a viscosity of 44 mPa·s (determined at 25° C. by an ELD type viscometer) and a shear-thinning index (n) of 0.246.

Example 3

Preparation of Dispersion of Particulate Adhesive Colored Resin

Into a 2-liter separable flask were charged 485.0 parts of water in which 15.0 parts of methyl cellulose [Metrose 90SH-100, produced by Shin-Etsu Chemical Co., Ltd.] were then dissolved to make a dispersant.

To the foregoing dispersant was then added a coloring composition consisting of 10.0 parts of carbon black (Printex L, produced by Degussa-Huls Japan Co., Ltd.), 81.0 parts of butyl acrylate, 5.4 parts of methyl methacrylate, 3.6 parts of ethylene glycol dimethacrylate and 2.0 parts of 2,2'-azobisisobutyronitrile. The mixture was then stirred at a high speed to make droplets having a particle diameter of about 5 $\mu$m. Stirring continued for 6 hours during which the reaction mixture was subjected to suspension polymerization at a temperature of 60° C.

The reaction solution was then allowed to cool to room temperature. The reaction solution was thoroughly washed in the same manner as in Example 1, and then subjected to centrifugal separation. The particulate material thus separated was then adjusted with water to a solid content of 50% by weight to obtain a dispersion of particulate adhesive black resin C.

The particulate adhesive black resin constituting the dispersion C thus obtained exhibited a glass transition temperature of −33° C., an average particle diameter of 5.6 $\mu$m and a particle diameter distribution such that the amount of particles having a particle diameter of from 2 $\mu$m to 10 $\mu$m is not less than 88.5% by weight of all the particles.

Preparation of Rubber-erasable Aqueous Ink Composition

An ink composition was then prepared in the same manner as in Example 2 except that 40 parts of the dispersion of particulate adhesive red resin B used in the preparation of ink composition were replaced by 40 parts of the dispersion of particulate adhesive black resin C.

The ink composition thus obtained exhibited a viscosity of 43 mPa·s (determined at 25° C. by an ELD type viscometer) and a shear-thinning index (n) of 0.240.

Example 4

Preparation of Dispersion of Particulate Adhesive Colored Resin

Into a 2-liter separable flask were charged 485.0 parts of water in which 15.0 parts of methyl cellulose [Metrose 90SH-100, produced by Shin-Etsu Chemical Co., Ltd.] were then dissolved to make a dispersant.

To the foregoing dispersant was then added a coloring composition consisting of 12.0 parts of a blue organic pigment (CROMOPHTAL Blue A3R, produced by Ciba Geigy Inc.), 79.2 parts of butyl acrylate, 7.0 parts of ethyl methacrylate, 1.8 parts of divinylbenzene and 2.0 parts of t-butylperoxy pivalate. The mixture was then stirred at a high speed to make droplets having a particle diameter of about 5 μm. Stirring continued for 6 hours during which the reaction mixture was subjected to suspension polymerization at a temperature of 60° C.

The reaction solution was then allowed to cool to room temperature. The reaction solution was thoroughly washed in the same manner as in Example 1, and then subjected to centrifugal separation. The particulate material thus separated was then adjusted with water to a solid content of 50% by weight to obtain a dispersion of particulate adhesive blue resin D.

The particulate adhesive blue resin constituting the dispersion D thus obtained exhibited a glass transition temperature of −32° C., an average particle diameter of 6.5 μm and a particle diameter distribution such that the amount of particles having a particle diameter of from 2 μm to 10 μm is not less than 93.5% by weight of all the particles.

Preparation of Rubber-erasable Aqueous Ink Composition

An ink composition was then prepared in the same manner as in Example 2 except that 40 parts of the dispersion of particulate adhesive red resin B used in the preparation of ink composition were replaced by 5.0 parts of a particulate nonadhesive black material (Artpearl C-800, produced by Negami Chemical Industrial Co., Ltd.; average particle diameter: 6.2 μm) and 30.0 parts of the dispersion of particulate adhesive blue material and the amount of water was changed from 51.1 parts to 56.1 parts.

The ink composition thus obtained exhibited a viscosity of 44 mPa·s (determined at 25° C. and 100 rpm by an ELD type viscometer) and a shear-thinning index (n) of 0.260.

Example 5

| Preparation of rubber-erasable aqueous ink composition | |
|---|---|
| Dispersion of particulate adhesive blue resin D | 40.0 |
| Diethylene glycol | 9.0 |
| Silicone-modified anti-foaming agent | 0.1 |
| Preservative (Proxel XL-2, produced by Zeneca Corp.) | 0.1 |
| Hexaglyceryl monoisostearate [S Face IS-601, produced by Sakamoto Yakuhin Kogyo Co., Ltd.; HLB: 10.8] | 9.0 |
| Phosphoric acid ester-based surface active agent [Plysurf M208B, produced by Dai-ichi Kogyo Seiyaku Co., Ltd.] | 0.5 |
| Water | 41.3 |
| Total | 100.0 |

Among these components, water and diethylene glycol were mixed. To the mixture was then added hexaglyceryl monoisostearate. To the mixture was then added the dispersion of particulate adhesive blue resin D with stirring by a disper. To the mixture were then added the anti-foaming agent, preservative and lubricant. Stirring continued to obtain an ink composition.

The ink composition thus obtained exhibited a viscosity of 43 mPa·s (determined at 25° C. and 100 rpm by an ELD type viscometer) and a shear-thinning index (n) of 0.232.

Example 6

Preparation of Dispersion of Particulate Adhesive Resin

Into a 2-liter separable flask equipped with an agitator were charged 600 parts of water in which 0.2 parts of sodium laurylsulfate and 20 parts of methyl cellulose [Metrose 90SH-100, produced by Shin-Etsu Chemical Co., Ltd.] were then dissolved to make a dispersant. To the foregoing dispersant was then added an oil phase solution consisting of 120 parts of butyl acrylate, 10 parts of methyl methacrylate, 2 parts of ethylene glycol dimethacrylate and 2.0 parts of 2,2'-azobisisobutyronitrile. The mixture was then stirred at 400 rpm until the average particle diameter reached about 6 μm. Subsequently, the suspension was heated to a temperature of 70° C. in an atmosphere of nitrogen for 6 hours during which it underwent suspension polymerization. The reaction solution was then allowed to cool to room temperature. The reaction solution was diluted with 1,000 parts of water, subjected to solid-liquid separation by centrifugal separation method, and then adjusted with water to a solid content of 40% to obtain a dispersion of particulate adhesive resin A.

The particulate material constituting the foregoing dispersion of particulate adhesive resin A exhibited an average particle diameter of 7.8 μm and a particle diameter distribution such that the amount of particles having a particle diameter of from 2 μm to 20 μm is not less than 85% by weight of all the particles.

| Preparation of ink composition | |
|---|---|
| Particulate black resin [Artpearl C-800, produced by Negami Chemical Industrial Co., Ltd.; average particle diameter: 6.1 μm; particles having a particle diameter distribution such that the amount of particles having a particle diameter of from 2 μm to 20 μm is not less than 95.0% by weight of all the particles] | 20.0 |
| Dispersion of particle adhesive resin A | 10.0 |
| Ethylene glycol | 10.0 |
| Penetrating agent [Acetynol EH, produced by Kawaken Finechemical Co., Ltd.] | 0.3 |
| Silicone-modified anti-foaming agent | 0.1 |
| Water | 59.6 |
| Total | 100.0 |

The foregoing components were mixed, and then stirred by a disper until homogeneity was attained to obtain an ink composition.

The ink composition thus obtained exhibited a viscosity of 6.7 mPa·s (determined at 25° C. by an ELD type viscometer).

Example 7

Preparation of Dispersion of Particulate Adhesive Resin

Into a 2-liter separable flask were charged 480 parts of water in which 20 parts of a polyvinyl alcohol [Gosenol GL-03, produced by The Nippon Synthetic Chemical Industry Co., Ltd.] were then dissolved to make a dispersant.

To the foregoing dispersant was then added a coloring composition consisting of 10 parts of carbon black (Printex L, produced by Degussa-Huls Japan Co., Ltd.), 60 parts of methyl methacrylate, 30 parts of ethylene glycol dimethacrylate and 2.0 parts of 2,2'-azobisisobutyronitrile. The mixture was then stirred at a high speed to make droplets having a particle diameter of about 5 μm. The suspension was further stirred at a temperature of 70° C. for 6 hours during which it underwent suspension polymerization.

The reaction solution was then allowed to cool to room temperature, diluted with 1,000 parts of water, subjected to solid-liquid separation by centrifugal separation method, and then adjusted with water to a solid content of 50% to obtain a dispersion of particulate black resin A.

The particulate material constituting the foregoing dispersion of particulate black resin A exhibited an average particle diameter of 5.8 μm and a particle diameter distribution such that the amount of particles having a particle diameter of from 2 μm to 10 μm is not less than 88% by weight of all the particles.

Preparation of Particulate Adhesive Resin

The reaction procedure of Example 6 was followed except that the oil phase solution of particulate adhesive resin A was replaced by 78 parts of butyl acrylate, 52 parts of ethyl methacrylate and 1 part of t-butyl peroxy pivalate. However, stirring was effected at 500 rpm until the average particle diameter of 4 μm was attained.

The particulate adhesive resin thus obtained was then adjusted with water to a solid content of 40% to obtain a dispersion of particulate adhesive resin B.

The particulate adhesive resin constituting the dispersion B thus obtained exhibited an average particle diameter of 4.8 μm and a particle diameter distribution such that the amount of particles having a particle diameter of from 2 μm to 10 μm is not less than 90% by weight of all the particles.

| Preparation of ink composition | |
|---|---|
| Dispersion of particulate black resin A | 40.0 |
| Dispersion of particulate adhesive resin B | 7.0 |
| Ethylene glycol | 10.0 |
| Urea | 5.0 |
| Silicone-modified anti-foaming agent | 0.1 |
| Preservative (Proxel XL-2, produced by Zeneca Corp.) | 1.0 |
| Succinoglycan (organic acid-modified heteropolysaccharide; average molecular weight: approx. 1,000,000 to 8,000,000) | 0.2 |
| Phosphoric acid ester-based surface active agent [Plysurf M208B, produced by Dai-ichi Kogyo Seiyaku Co., Ltd.] | 0.5 |
| Water | 36.2 |
| Total | 100.0 |

The foregoing components were mixed, and then stirred by a disper until homogeneity was attained to obtain an ink composition.

The ink composition thus obtained exhibited a viscosity of 53 mPa·s (determined at 25° C. and 100 rpm by an ELD type viscometer) and a shear-thinning index (n) of 0.251.

Example 8

Preparation of Particulate Colored Resin

Into a 2-liter beaker were charged 480.0 parts of water in which 20.0 parts of a polyvinyl alcohol [Gosenol GL-03, produced by The Nippon Synthetic Chemical Industry Co., Ltd.] were then dissolved to make a dispersant.

To the foregoing dispersant was then added a coloring composition consisting of 15 parts of a phthalocyanine-based blue organic pigment (Fastgen Blue 5007, produced by DAINIPPON INK & CHEMICALS, INC.), 85 parts of an epoxy resin (bisphenol A/diglycidylether-based epoxy resin; epoxy equivalent: 184–194) and 60 parts of ethyl acetate. The mixture was then stirred at a high speed to make droplets having a particle diameter of about 5 μm. The mixture was heated to a temperature of 60° C. with stirring where a solution of 21 parts of an epoxy resin hardener (aliphatic polyamine) in 200 parts of water was then added dropwise thereto in about 1 hour. Subsequently, the reaction solution was heated to a temperature of 80° C. where it was then stirred for 5 hours to cause ethyl acetate to evaporate.

The reaction solution was allowed to cool to room temperature, washed with 1,000 parts of water, subjected to solid-liquid separation by centrifugal separation method, and then adjusted with water to obtain a dispersion of particulate blue resin B having a solid content of 50% by weight.

The particulate material constituting the dispersion B thus obtained exhibited an average particle diameter of 6.7 μm and a particle diameter distribution such that the amount of particles having a particle diameter of from 2 μm to 10 μm is not less than 91% by weight of all the particles.

| Preparation of ink composition | |
|---|---|
| Dispersion of particulate blue resin B | 36.0 |
| Dispersion of particulate adhesive resin A | 12.0 |
| Ethylene glycol | 10.0 |
| Silicone-modified anti-foaming agent | 0.1 |
| Preservative (Proxel XL-2, produced by Zeneca Corp.) | 0.5 |
| Hexaglyceryl monoisostearate [S Face IS-601, produced by Sakamoto Yakuhin Kogyo Co., Ltd.; HLB: 10.8] | 9.0 |
| Phosphoric acid ester-based surface active agent [Plysurf M208B, produced by Dai-ichi Kogyo Seiyaku Co., Ltd.] | 0.5 |
| Water | 31.9 |
| Total | 100.0 |

Among these components, water and ethylene glycol were mixed. To the mixture was then added hexaglyceryl monoisostearate. To the mixture were then added the dispersion of particulate adhesive blue resin H and the dispersion of particulate adhesive resin G with stirring by a disper. To the mixture were then added the anti-foaming agent, preservative and lubricant. Stirring continued to obtain an ink composition.

The ink composition thus obtained exhibited a viscosity of 58 mPa·s (determined at 25° C. and 100 rpm by an ELD type viscometer) and a shear-thinning index (n) of 0.271.

Comparative Example 1

| Preparation of aqueous ink composition | |
|---|---|
| Carbon black-processed pigment [Sandye Super BLACK C, produced by Sanyo Colorworks, Ltd.; solid content: 36%; average particle diameter: 0.2 μm] | 20.0 |

-continued

| Preparation of aqueous ink composition | |
|---|---|
| Acryl emulsion [Boncoat 9404, produced by DAINIPPON INK & CHEMICALS, INC.; average particle diameter: 0.1 μm; glass transition temperature: 48° C.] | 20.0 |
| Ethylene glycol | 10.0 |
| Penetrating agent [Acetynol EH, produced by Kawaken Finechemical Co., Ltd.] | 0.3 |
| Water | 49.7 |
| Total | 100.0 |

The foregoing components were mixed, and then stirred by a disper until homogeneity was attained to obtain an ink composition.

The ink composition thus obtained exhibited a viscosity of 3.4 mPa·s (determined at 25° C. by an ELD type viscometer).

Comparative Example 2

| Preparation of aqueous ink composition | |
|---|---|
| Carbon black-processed pigment [Sandye Super BLACK C, produced by Sanyo Colorworks, Ltd.; solid content: 36%; average particle diameter: 0.2 μm] | 20.0 |
| Acryl emulsion [Boncoat ST-372, produced by DAINIPPON INK & CHEMICALS, INC.; average particle diameter: 0.2 μm; glass transition temperature: −11° C.] | 20.0 |
| Ethylene glycol | 10.0 |
| Penetrating agent [Acetynol EH, produced by Kawaken Finechemical Co., Ltd.] | 0.3 |
| Water | 49.7 |
| Total | 100.0 |

The foregoing components were mixed, and then stirred by a disper until homogeneity was attained to obtain an ink composition.

The ink composition thus obtained exhibited a viscosity of 2.5 mPa·s (determined at 25° C. by an ELD type viscometer).

Comparative Example 3

| Preparation of aqueous ink composition | |
|---|---|
| Particulate nonadhesive black resin [Art Pearl C-800; average particle diameter: 6.2 μm, produced by Negami Chemical Industrial Co., Ltd.] | 15.0 |
| Styrene butadiene latex [Nipol 4850A, produced by Nippon Zeon Co., Ltd.; average particle diameter: 0.3 μm) | 30.0 |
| Ethylene glycol | 10.0 |
| Penetrating agent [SN Wet 366, produced by Sannopco Limited] | 0.5 |
| Water | 44.5 |
| Total | 100.0 |

The foregoing components were mixed, and then stirred by a disper until homogeneity was attained to obtain an ink composition.

The ink composition thus obtained exhibited a viscosity of 8.2 mPa·s (determined at 25° C. by an ELD type viscometer).

Comparative Example 4

Preparation of Dispersion of Particulate Adhesive Colored Resin

A dispersion of particulate adhesive red resin B' was prepared in the same manner as in Example 2 except that the same composition as that of the dispersion of particulate adhesive red resin B was stirred at a high speed to make droplets having a particle diameter of about 1 μm.

The particulate adhesive red resin thus obtained exhibited a glass transition temperature of −32° C., an average particle diameter of 0.9 μm and a particle diameter distribution such that the amount of particles having a particle diameter of from 2 μm to 20 μm is not less than 29.0% by weight of all the particles.

Preparation of Aqueous Ink Composition

An ink composition was prepared in the same manner as in Example 2 except that 40 parts of the dispersion of particulate adhesive red resin B were replaced by 40 parts of the dispersion of particulate adhesive red resin B'.

The ink composition thus obtained exhibited a viscosity of 46 mPa·s (determined at 25° C. and 100 rpm by an ELD type viscometer) and a shear-thinning index (n) of 0.257.

Comparative Example 5

Preparation of Dispersion of Particulate Adhesive Colored Resin

A dispersion of particulate adhesive red resin C' having a solid content of 50% by weight was prepared in the same manner as in Example 3 except that 10.0 parts of carbon black were replaced by C. I. Solvent Black 50 (Oleosol Black AR, produced by TAOKA CHEMICAL CO., LTD.).

The particulate material constituting the dispersion of adhesive black resin C' thus obtained exhibited a glass transition temperature of −33° C., an average particle diameter of 5.3 μm and a particle diameter distribution such that the amount of particles having a particle diameter of from 2 μm to 10 μm is not less than 90.5% by weight of all the particles.

Preparation of Aqueous Ink Composition

An ink composition was prepared in the same manner as in Example 4 except that 40 parts of the dispersion of particulate adhesive blue resin D were replaced by 40 parts of the dispersion of particulate adhesive black resin C'.

The ink composition thus obtained exhibited a viscosity of 45 mPa·s (determined at 25° C. and 100 rpm by an ELD type viscometer) and a shear-thinning index (n) of 0.250.

Comparative Example 6

An ink composition was prepared in the same manner as in Example 6 except that 20 parts of the particulate black resin were replaced by 20 parts of a carbon black-processed pigment [Sandye Super BLACK C, produced by Sanyo Colorworks, Ltd.; solid content: 36%; average particle diameter: 0.2 μm].

The ink composition thus obtained exhibited a viscosity of 7.2 mPa·s (determined by an ELD type viscometer at 25° C.).

Comparative Example 7

Preparation of Dispersion of Particulate Colored Resin

A dispersion of particulate black resin A' having a solid content of 50% by weight was-prepared in the same manner as in Example 7 except that the same composition as that of the dispersion of particulate colored resin A was stirred at a high speed to make droplets having a particle diameter of about 2 μm.

The particulate material constituting the dispersion of particulate black resin A' thus obtained exhibited an average particle diameter of 2.8 μm and a particle diameter distribution such that the amount of particles having a particle diameter of from 2 μm to 10 μm is not less than 58% by weight of all the particles.

Preparation of Dispersion of Particulate Adhesive Resin

A dispersion of particulate adhesive resin A' having a solid content of 40% by weight was prepared in the same manner as in Example 6 except that the same composition as that of the dispersion of particulate adhesive resin A was stirred at a high speed to make droplets having a particle diameter of about 2 μm.

The particulate material constituting the dispersion of particulate adhesive A' resin thus obtained exhibited an average particle diameter of 2.3 μm and a particle diameter distribution such that the amount of particles having a particle diameter of from 2 μm to 10 μm is not less than 53.0% by weight of all the particles.

Preparation of Ink Composition

An ink composition was prepared in the same manner as in Example 7 except that 40 parts of the dispersion of particulate black resin A and 7.0 parts of the dispersion of particulate adhesive resin B were replaced by 40 parts of the dispersion of particulate black resin A' and 7.0 parts of the dispersion of particulate adhesive resin A', respectively.

The ink composition thus obtained exhibited a viscosity of 57 mPa·s (determined by an ELD type viscometer at 25° C. and 100 rpm) and a shear-thinning index (n) of 0.269.

Comparative Example 8

Preparation of Dispersion of Particulate Adhesive Resin

A dispersion of particulate adhesive resin B' having a solid content of 40% by weight was prepared in the same manner as in Example 7 except that the same composition as that of the dispersion of particulate adhesive resin B was stirred at a high speed to make droplets having a particle diameter of about 2 μm.

The particulate material constituting the dispersion of particulate adhesive resin B' thus obtained exhibited an average particle diameter of 3.2 μm and a particle diameter distribution such that the amount of particles having a particle diameter of from 2 μm to 20 μm is not less than 61% by weight of all the particles Preparation of Ink Composition An ink composition was prepared in the same manner as in Example 8 except that 12 parts of the dispersion of particulate adhesive resin A were replaced by 12 parts of the dispersion of particulate adhesive B'.

The ink composition thus obtained exhibited a viscosity of 61 mPa·s (determined by an ELD type viscometer at 25° C. and 100 rpm) and a shear-thinning index (n) of 0.282.

Preparation of Sample Marking Pen

The ink compositions of Examples 1 and 6 and Comparative Examples 1 to 3 and 5 were each packed into a marking pen of the type including a valve mechanism provided in an aluminum cylindrical holder arranged such that when a tip formed at the forward end of the pen by binding a bundle of fibers with a resin is pressed against the surface of paper during writing, the ink in the cylindrical holder is then introduced into the tip. Thus, sample marking pens were prepared.

Preparation of Sample Ball Point Pen

The ink compositions of Examples 2 to 5, 7 and 8 and Comparative Examples 4, 5, 7 and 8 were each packed into a ball point pen of the type including a stainless steel tip holding a hard metal ball having a diameter of 0.7 mm fitted at one end of a polypropylene cylindrical holder, an ink follower (silicone grease-based material) centrifugally packed close to the rear end of the ink pack and a rear plug fitted at the rear end of the holder. Thus, sample ball point pens were prepared.

Erasability Test and Fretting Resistance Test

Using the foregoing various sample pens, a circle having a diameter of 2 cm was continuously drawn on the surface of a report paper (Model No. Re-116AN, produced by KOKUYO CO., LTD.). The resulting writing was then rubbed with an eraser [STAR Radar, produced by Seed Rubber Industry Co., Ltd.] after 5 seconds and 1 day to judge difficulty in erasure.

For the fretting resistance test, a filter paper (No. 2 filter paper, produced by ADVANTEC CO., LTD.) was put on the writing after 1 hour in an arrangement such that the smooth surface thereof faced the writing. The filter paper was then reciprocally slid along the writing 10 times under a load of 45.5 g/cm² to judge the fretting resistance of the writing.

The results of erasability test and fretting resistance test, the average particle diameter of the particulate adhesive colored resin, particulate colored resin and particulate adhesive resin (Comparative Examples 1 to 3 include a coloring agent and a particulate resin), the form of writing materials and the color tone of writing are set forth in the tables below.

TABLE 1

| Example No. | Erasability test Erasability after 5 seconds | Erasability after 1 day | Fretting resistance test | Average particle diameter of particulate adhesive colored resin | Form of writing materials | Color tone of writing |
|---|---|---|---|---|---|---|
| Example 1 | ○ | ○ | Δ | 8.2 μm | Marking pen | Black |
| Example 2 | ○ | ○ | ○ | 5.8 μm | Ball point pen | Red |
| Example 3 | ○ | ○ | ○ | 5.6 μm | Ball point pen | Black |
| Example 4 | ○ | ○ | ○ | 6.5 μm | Ball point pen | Blue black |
| Example 5 | ○ | ○ | ○ | 6.5 μm | Ball point pen | Yellow |

TABLE 2

| Example No. | Erasability test Erasability after 5 seconds | Erasability after 1 day | Fretting resistance test | Average particle diameter of particlulate colored resin | Average particle diameter of particulate adhesive resin | Form of writing materials | Color tone of writing |
|---|---|---|---|---|---|---|---|
| Example 6 | ○ | ○ | ○ | 6.1 μm | 7.8 μm | Marking pen | Black |
| Example 7 | ○ | ○ | ○ | 5.8 μm | 4.8 μm | Ball point pen | Black |
| Example 8 | ○ | ○ | ○ | 6.7 μm | 4.8 μm | Ball point pen | Blue |

TABLE 3

| Example No. | Erasability test Erasability after 5 seconds | Erasability after 1 day | Fretting resistance test | Average particle diameter of coloring agent | Average particle diameter of particulate resin | Form of writing materials | Color tone of writing |
|---|---|---|---|---|---|---|---|
| Comparative Example 1 | X | X | ○ | 0.2 μm | 0.1 μm | Marking pen | Black |
| Comparative Example 2 | X | X | ○ | 0.2 μm | 0.2 μm | Marking pen | Black |
| Comparative Example 3 | ○ | ○ | X | 6.2 μm | 0.3 μm | Marking pen | Black |
| Comparative Example 4 | X | X | ○ | 0.9 μm | | Ball point pen | Red |
| Comparative Example 5 | ○ | X | ○ | 5.3 μm | | Ball point pen | Black |

*Regarding to Comparative Examples 4 and 5, the average particle diameter of particulate adhesive resin is described.

TABLE 4

| Example No. | Erasability test Erasability after 5 seconds | Erasability after 1 day | Fretting resistance test | Average particle diameter of particlulate colored resin | Average particle diameter of particulate adhesive resin | Form of writing materials | Color tone of writing |
|---|---|---|---|---|---|---|---|
| Comparative Example 6 | X | X | ○ | 0.2 μm | 7.8 μm | Marking pen | Black |
| Comparative Example 7 | X | X | ○ | 2.8 μm | 2.3 μm | Ball point pen | Black |
| Comparative Example 8 | Δ | X | ○ | 6.7 μm | 3.2 μm | Ball point pen | Blue |

The judgment symbols for erasability and fretting resistance in the tables above indicate the following:

Erasability

○: Easily erased;
Δ: Erased by 10 times rubbing but writing left slightly;
X: Not erased by 10 times rubbing Fretting Resistance ○: Little or no peeling of writing;
Δ: Writing slightly peeled but can be sufficiently recognized
X: Writing mostly peeled and cannot be recognized Examples and comparative examples of the ink composition including the particulate thermoplastic colored resin and particulate adhesive resin of the present invention and the ink composition including the particulate adhesive colored resin and particulate thermoplastic resin of the present invention will be described hereinafter.

Example 9

Preparation of Particulate Thermoplastic Colored Resin 80 parts of a styrene-butyl acrylate-maleic acid copolymer (monomer ratio: 70:20:10), 10 parts of apolystyrene and 10 parts of carbon black [MA-100, produced by Mitsubishi Chemical Corporation] were mixed, melt-kneaded over a heat roll mill, cooled, coarsely ground by a hammer mill, finely ground by a jet mill, and then classified by an air classifier to obtain a particulate thermoplastic black resin A.

The particulate thermoplastic black resin A thus obtained exhibited an average particle diameter of 8.2 μm, a softening point of 130° C., MI value of 3.0 and a particle diameter distribution such that the amount of particles having a particle diameter of from 2 μm to 20 μm is not less than 78% by weight of all the particles.

Preparation of Particulate Adhesive Resin

The same composition as in Example 6 was processed in the same manner as in Example 6 to obtain a dispersion of particulate adhesive resin C.

The particulate material constituting the dispersion of particulate adhesive resin C thus obtained exhibited an average particle diameter of 5.8 μm and a particle diameter distribution such that the amount of particles having a particle diameter of from 2 μm to 20 μm is not less than 85% by weight of all the particles.

Preparation of Ink Composition 20 parts of the dispersion of particulate thermoplastic black resin A, 10 parts of the dispersion of adhesive resin C, 10.0 parts of ethylene glycol, 0.3 parts of a penetrating agent [Acetynol EH, produced by Kawaken Finechemical Co., Ltd.], 0.1 parts of a silicone-modified anti-foaming agent and 59.6 parts of water were mixed, and then stirred by a disper until homogeneity was attained to obtain an ink composition.

The ink composition thus obtained exhibited a viscosity of 6.7 mPa·s (determined by an ELD type viscometer at 25° C.).

Example 10

Preparation of Particulate Adhesive Colored Resin 2,000 parts of a polyoxypropylene (2'2)-2'2-bis(4-hydroxyphenyl)propane and 28 parts of glycerin were poured into a four-necked round flask equipped with a stirring rod, a thermometer, an intake tube and a condenser. Nitrogen gas was then introduced into the flask through the intake tube to keep the interior of the flask in an atmosphere of nitrogen. The flask was then heated by a mantle heater to heat the mixture to a temperature of 52° C. To the mixture were then added 750 parts of fumaric acid and 1.2 parts of hydroquinone. The mixture was heated to a temperature of 200° C. where it then continued to undergo reaction for about 10 hours while the water of reaction being removed.

The foregoing mixture was allowed to cool to room temperature, subjected to solid-liquid separation, and then dried to obtain a thermoplastic polyester resin.

100 parts of the foregoing polyester resin and 20 parts of a phthalocyanine-based blue organic pigment (Fastgen Blue 5007, produced by DAINIPPON INK & CHEMICALS, INC.) were mixed, melt-kneaded over a heat roll mill, cooled, coarsely ground by a hammer mill, finely ground by a jet mill, and then classified by an air classifier to obtain a particulate thermoplastic blue resin B.

The particulate thermoplastic blue resin B thus obtained exhibited an average particle diameter of 6.3 μm, a softening point of 140° C., MI value of 2.0 and a particle diameter distribution such that the amount of particles having a particle diameter of from 2 μm to 10 μm is not less than 96.0% by weight of all the particles.

Preparation of Particulate Adhesive Resin

The reaction procedure of Example 6 was followed except that the oil phase solution of particulate adhesive resin A was replaced by 110 parts of 2-ethylhexyl acrylate, 20 parts of butyl methacrylate, 1 part of divinylbenzene and 2 parts of 2,2'-azobisisobutyronitrile.

However, stirring was effected at 500 rpm until the average particle diameter of 4 μm was attained.

The particulate adhesive resin thus obtained was then adjusted with water to a solid content of 40% to obtain a dispersion of particulate adhesive resin D.

The particulate material constituting the dispersion of particulate adhesive resin D thus obtained exhibited an average particle diameter of 4.2 μm and a particle diameter distribution such that the amount of particles having a particle diameter of from 2 μm to 10 μm is not less than 98.0% by weight of all the particles.

Preparation of Ink Composition 20 parts of a particulate thermoplastic blue resin B, 7 parts of the dispersion of particulate adhesive resin D, 10 parts of ethylene glycol, 5 parts of urea, 0.1 parts of a silicone-modified anti-foaming agent, 0.2 parts of a preservative (Proxel XL-2, produced by Zeneca Corp.), 0.2 parts of succinoglycan (organic acid-modified heteropolysaccharide; average molecular weight: approx. 1,000,000 to 8,000,000), 0.2 parts of a phosphoric acid ester-based surfactant [Plysurf M208B, produced by Dai-ichi Kogyo Seiyaku Co., Ltd.], 1 part of triethanolamine polyoxylaurylethersulfate [SBL-4T, produced by Nikko Chemicals Co., Ltd.] and 55.5 parts of water were mixed, and then stirred by a disper until homogeneity was attained to obtain an ink composition.

The ink composition thus obtained exhibited a viscosity of 53 mPa·s (determined at 25° C. and 100 rpm by an ELD type viscometer) and a shear-thinning index (n) of 0.251.

Example 11

Preparation of Particulate Thermoplastic Colored Resin

Into a 2-liter separable flask were poured 600 parts of water in which 0.2 parts of sodium laurylsulfate and 20 parts of methyl cellulose [Metrose 90SH-100, produced by Shin-Etsu Chemical Co., Ltd.] were then dissolved to make a dispersant.

To the foregoing dispersant was then added an oil phase solution consisting of 20 parts of a red organic pigment (CINQUASIA Scarlet RT-787-D, produced by Ciba Geigy Inc.), 115 parts of styrene, 25 parts of butyl acrylate, 0.05 parts of 1,6-hexanediol diacrylate, 3 parts of 2,2'-azobisisobutyronitrile and 30 parts of toluene. The mixture was then stirred at 400 rpm to make droplets having an average particle diameter of about 6 μm. Subsequently, in an atmosphere of nitrogen, the suspension was heated to a temperature of 70° C. where stirring continued for 6 hours during which the reaction mixture was subjected to suspension polymerization.

The reaction solution was heated to a temperature of 100° C. where toluene and residual monomers were then azeotropically distilled off. The reaction solution was allowed to cool to room temperature, washed with 2,000 parts of water, subjected to solid-liquid separation by centrifugal separation method, and then adjusted with water to a solid content of 50% by weight to obtain a dispersion of particulate thermoplastic red resin C.

The particulate material constituting the dispersion of particulate thermoplastic red resin C thus obtained exhibited an average particle diameter of 6.1 μm, a softening point of 146° C., MI value of 2.0 and a particle diameter distribution such that the amount of particles having a particle diameter of from 2 μm to 10 μm is not less than 85% by weight of all the particles.

Preparation of Particulate Adhesive Resin

The reaction procedure of Example 6 was followed except that the oil phase solution of particulate adhesive resin A was replaced by 78 parts of butyl acrylate, 52 parts of ethyl methacrylate and 1 part of t-butyl peroxy pivalate. However, stirring was effected at 500 rpm until the average particle diameter of 4 μm was attained.

The particulate adhesive resin thus obtained was then adjusted with water to a solid content of 40% to obtain a dispersion of particulate adhesive resin E.

The particulate material constituting the dispersion of particulate adhesive resin E thus obtained exhibited an average particle diameter of 4.8 μm and a particle diameter distribution such that the amount of particles having a particle diameter of from 2 μm to 10 μm is not less than 90% by weight of all the particles.

Preparation of Ink Composition

To 10 parts of ethylene glycol were added 5.2 parts of dioctylsodium sulfosuccinate [OTP-100, produced by Nikko Chemicals Co., Ltd.] and 7.7 parts of amidepropyldimethylamino acid betain of palm oil aliphatic acid [AM-3130N, produced by Nikko Chemicals Co., Ltd.]. To the mixture were then added 36 parts of the dispersion of particulate thermoplastic red resin C, 8 parts of the dispersion of particulate adhesive resin E and 32.5 parts of water with stirring by a disper. To the mixture were then added 0.1 parts of a silicone-modified anti-foaming agent and 0.5 parts of a preservative (Proxel XL-2, produced by Zeneca Corp.). The mixture was then stirred to obtain an ink composition.

The ink composition thus obtained exhibited a viscosity of 81 mPa·s (determined at 25° C. and 100 rpm by an ELD type viscometer) and a shear-thinning index (n) of 0.283.

Example 12

Preparation of Dispersion of Particulate Adhesive Colored Resin

Into a 2-liter separable flask were charged 480 parts of water in which 20 parts of a polyvinyl alcohol [Gosenol GL-03, produced by The Nippon Synthetic Chemical Industry Co., Ltd.] were then dissolved to make a dispersant.

To the foregoing dispersant was then added an oil phase solution consisting of 8 parts of carbon black (Printex L, produced by Degussa-Huls Japan Co., Ltd.), 45 parts of butyl acrylate, 45 parts of styrene, 2 parts of divinylbenzene and 2 parts of 2,2'-azobisisobutyronitrile. The mixture was then stirred at 400 rpm to make droplets having an average particle diameter of about 8 μm. Subsequently, in an atmosphere of nitrogen, the suspension was heated to a temperature of 70° C. where stirring continued for 6 hours during which the reaction mixture was subjected to suspension polymerization.

The reaction solution was then allowed to cool to room temperature. The reaction solution was diluted with 1,000 parts of water, subjected to solid-liquid separation by centrifugal separation method, and then adjusted with water to a solid content of 50% to obtain a dispersion of particulate adhesive black resin E.

The particulate material constituting the foregoing dispersion of particulate adhesive black resin E exhibited an average particle diameter of 9.1 μm and a particle diameter distribution such that the amount of particles having a particle diameter of from 2 μm to 20 μm is not less than 82% by weight of all the particles.

Preparation of Dispersion of Particulate Thermoplastic Resin 2,000 parts of a polyoxypropylene(2'2)-2'2-bis(4-hydroxyphenyl)propane and 45 parts of a polyoxypropylene (6)sorbitol were poured into a four-necked round flask equipped with a stirring rod, a thermometer, an intake tube and a condenser. Nitrogen gas was then introduced into the flask through the intake tube to keep the interior of the flask in an atmosphere of nitrogen. The flask was then heated by a mantel heater to heat the mixture to a temperature of 52° C. To the mixture were then added 730 parts of fumaric acid and 1.2 parts of hydroquinone. The mixture was heated to a temperature of 200° C. where it then continued to undergo reaction for about 10 hours while the water of reaction being removed.

The foregoing mixture was allowed to cool to room temperature, subjected to solid-liquid separation, dried, coarsely ground by a hammer mill, finely ground by a jet mill, and then classified by an air classifier to obtain a particulate thermoplastic resin A.

The particulate thermoplastic resin A thus obtained exhibited an average particle diameter of 7.4 μm, a softening point of 130° C., MI value of 6.0 and a particle diameter distribution such that the amount of particles having a particle diameter of from 2 μm to 20 μm is not less than 78% by weight of all the particles.

Preparation of Ink Composition 40 parts of the dispersion of particulate adhesive black resin E, 8 parts of the particulate thermoplastic resin A, 10 parts of ethylene glycol, 0.3 parts of a penetrating agent [Acetynol EH, produced by Kawaken Finechemical Co., Ltd.], 0.1 parts of a silicone-modified anti-foaming agent and 41.6 parts of water were mixed, and then stirred by a disper until homogeneity was attained to obtain an ink composition.

The ink composition thus obtained exhibited a viscosity of 7.2 mPa·s (determined at 25° C. by an ELD type viscometer).

Example 13

Preparation of Particulate Adhesive Colored Resin

Into a 2-liter separable flask were charged 475 parts of water in which 25 parts of a polyvinyl alcohol [Gosenol GL-03, produced by The Nippon Synthetic Chemical Industry Co., Ltd.] were then dissolved to make a dispersant.

To the foregoing dispersant was then added an oil phase solution consisting of 11 parts of a red organic pigment (CINQUASIA Scarlet RT-787-D, produced by Ciba Geigy Inc.), 80 parts of butyl acrylate, 4 parts of methyl methacrylate, 5 parts of ethylene glycol dimethacrylate and 2 parts of t-butyl peroxy pivalate. The mixture was then stirred at 400 rpm to make droplets having an average particle diameter of about 6 μm. Subsequently, in an atmosphere of nitrogen, the suspension was heated to a temperature of 70° C. where stirring continued for 6 hours during which the reaction mixture was subjected to suspension polymerization.

The reaction solution was allowed to cool to room temperature, diluted with 1,000 parts of water, subjected to solid-liquid separation by centrifugal separation method, and then adjusted with water to a solid content of 50% by weight to obtain a dispersion of particulate adhesive red resin F.

The particulate material constituting the dispersion of particulate adhesive red resin F thus obtained exhibited an average particle diameter of 5.8 μm and a particle diameter distribution such that the amount of particles having a particle diameter of from 2 μm to 10 μm is not less than 97% by weight of all the particles.

Preparation of Particulate Thermoplastic Resin

Into a 2-liter separable flask were charged 600 parts of water in which 0.2 parts of sodium laurylsulfate and 20 parts of methyl cellulose [Metrose 90SH-100, produced by Shin-Etsu Chemical Co., Ltd.] were then dissolved to make a dispersant.

To the foregoing dispersant was then added a mixture of 134 parts of styrene, 6 parts of butyl acrylate and 3 parts of 2,2'-azobisisobutyronitrile. Stirring continued at 400 rpm to make droplets having an average particle diameter of about 6 μm. Subsequently, the suspension was heated to a temperature of 70° C. in an atmosphere of nitrogen for 6 hours during which it underwent suspension polymerization.

The reaction solution was then allowed to cool to room temperature. The reaction solution was washed with 2,000 parts of water, subjected to solid-liquid separation by centrifugal separation method, and then adjusted with water to a solid content of 50% to obtain a dispersion of particulate thermoplastic resin B.

The particulate material constituting the foregoing dispersion of particulate thermoplastic resin B exhibited an average particle diameter of 6.4 μm, a softening point of 125° C., MI value of 15.0 and a particle diameter distribution such that the amount of particles having a particle diameter of from 2 μm to 10 μm is not less than 93% by weight of all the particles.

Preparation of Ink Composition 36 parts of the dispersion of particulate adhesive red resin F, 10 parts of the particulate thermoplastic resin B, 10 parts of ethylene glycol, 5 parts of urea, 0.1 parts of a silicone-modified anti-foaming agent, 1 part of a preservative (Proxel XL-2, produced by Zeneca Corp.), 0.2 parts of succinoglycan (organic acid-modified heteropolysaccharide; average molecular weight: approx. 1,000,000 to 8,000,000), 0.2 parts of a phosphoric acid ester-based surfactant [Plysurf M208B, produced by Dai-ichi Kogyo Seiyaku Co., Ltd.], 1 part of sodium laurylsulfate [SLS, produced by Nikko Chemicals Co., Ltd.] and 36.5 parts of water were mixed, and then stirred by a disper until homogeneity was attained to obtain an ink composition.

The ink composition thus obtained exhibited a viscosity of 51 mPa·s (determined at 25° C. and 100 rpm by an ELD type viscometer) and a shear-thinning index (n) of 0.224.

Example 14

Preparation of Particulate Adhesive Colored Resin

Into a 2-liter separable flask were charged 485 parts of water in which 0.2 parts of sodium laurylsulfate and 15 parts of Metrose 90SH-100 [methyl cellulose,.produced by Shin-Etsu Chemical Co., Ltd.] were then dissolved to make a dispersant.

To the foregoing dispersant was then added a coloring composition consisting of 10 parts of carbon black (Printex L, produced by Degussa-Huls Japan Co., Ltd.), 81 parts of butyl acrylate, 5.4 parts of methyl methacrylate, 3.6 parts of ethylene glycol dimethacrylate and 2 parts of 2,2'-azobisisobutyronitrile. Stirring continued at 400 rpm until the average particle diameter reached about 5 μm. Subsequently, the suspension was heated to a temperature of 70° C. in an atmosphere of nitrogen for 6 hours during which it underwent suspension polymerization.

The reaction solution was then allowed to cool to room temperature. The reaction solution was diluted with 1,000 parts of water, subjected to solid-liquid separation by centrifugal separation method, and then adjusted with water to a solid content of 50% to obtain a dispersion of particulate adhesive black resin G.

The particulate material constituting the foregoing dispersion of particulate adhesive black resin G exhibited an average particle diameter of 5.4 μm and a particle diameter distribution such that the amount of particles having a particle diameter of from 2 μm to 10 μm is not less than 84% by weight of all the particles.

Preparation of Ink Composition

An ink composition was prepared in the same manner as in Example 11 except that the dispersion of particulate thermoplastic red resin C, the dispersion of particulate adhesive resin C and water were replaced by 36 parts of the dispersion of particulate adhesive black resin G, 16 parts of the dispersion of particulate thermoplastic resin B and 24.5 parts of water, respectively.

The ink composition thus obtained exhibited a viscosity of 79 mPa·s (determined at 25° C. and 100 rpm by an EMD type viscometer) and a shear-thinning index (n) of 0.291.

Preparation of Particulate Thermoplastic Colored Resin

The particulate thermoplastic black resin A of Example 9 was further finely ground to obtain a particulate thermoplastic black resin A'.

The particulate thermoplastic black resin A' thus obtained exhibited an average particle diameter of 3.0 μm, a softening point of 130° C., MI value of 9.0 and particles having a particle diameter distribution such that the amount of particles having a particle diameter of less than 2 μm is 39% by weight of all the particles and particles having a particle diameter distribution such that the amount of particles having a particle diameter from 2 μm to 20 μm is 61% by weight of all the particles.

Preparation of Ink Composition

An ink composition was prepared from the same composition in the same manner as in Example 9 except that the particulate thermoplastic black resin A was replaced by the particulate thermoplastic black resin A'.

The ink composition thus obtained exhibited a viscosity of 7.1 mPa·s (determined by an ELD type viscometer at 25° C.).

Comparative Example 10

An ink composition was prepared from the same composition in the same manner as in Example 10 except that the particulate adhesive resin D was replaced by an acryl emulsion [Boncoat ST-372, produced by DAINIPPON INK & CHEMICALS, INC.; solid content: 40%; average particle diameter: 0.2 μm; particles a particle diameter distribution such that the amount of particles having a particle diameter of from 2 μm to 10 μm is not less than 2% by weight of all the particles].

The ink composition thus obtained exhibited a viscosity of 52 mPa·s (determined at 25° C. and 100 rpm by an ELD type viscometer) and a shear-thinning index (n) of 0.248.

Comparative Example 11

An ink composition was prepared from the same composition in the same manner as in Example 2 except that the particulate thermoplastic blue resin B was replaced by a particulate thermosetting black resin [Artpearl C-800, produced by Negami Chemical Industrial Co., Ltd.; average particle diameter: 6.1 µm; particles having a particle diameter distribution such that the amount of particles having a particle diameter of from 2 µm to 20 µm is not less than 95% by weight of all the particles].

The ink composition thus obtained exhibited a viscosity of 54 mPa·s (determined at 25° C. and 100 rpm by an ELD type viscometer) and a shear-thinning index (n) of 0.254.

Comparative Example 12

Preparation of Particulate Thermoplastic Colored Resin

A dispersion of thermoplastic red resin C' having a solid content of 40% by weight was prepared in the same manner as in Example 2 except that 115 parts of styrene, 25 parts of butyl acrylate and 0.05 parts of 1,6-hexanediol diacrylate used in the preparation of the dispersion of particulate thermoplastic red resin were replaced by 112 parts of styrene, 28 parts of butyl acrylate and 0.6 parts of divinylbenzene, respectively.

The particulate material constituting the dispersion of particulate thermoplastic red resin C' exhibited an average particle diameter of 5.8 µm, a softening point of 210° C., MI value of 0.05 and a particle diameter distribution such that particles having a particle diameter distribution such that the amount of particles having a particle diameter of from 2 µm to 10 µm is not less than 92% by weight of all the particles.

Preparation of Ink Composition

An ink composition was prepared from the same composition in the same manner as in Example 11 except that 36 parts of the dispersion of particulate thermoplastic red resin C were replaced by 36 parts of the dispersion of particulate thermoplastic red resin C'.

The ink composition thus obtained exhibited a viscosity of 85 mPa·s (determined by an ELD type viscometer at 25° C. and 100 rpm) and a shear-thinning index (n) of 0.292.

Comparative Example 13

A dispersion of particulate adhesive black resin E' having a solid content of 50% by weight was prepared in the same manner as in Example 12 except that the dispersion of particulate adhesive black resin E thus prepared was stirred at a high speed to make droplets having a particle diameter of about 2 µm.

The particulate material thus obtained exhibited an average particle diameter of 2.1 µm and a particle diameter distribution such that the amount of particles having a particle diameter of less than 2 µm is 45% by weight of all the particles and the amount of particles having a particle diameter of from 2 µm to 20 µm is 55% by weight of all the particles.

Preparation of Ink Composition

An ink composition was prepared in the same manner as in Example 4 except that 40 parts of the dispersion of particulate adhesive black resin E of Example 12 were replaced by 40 parts of the dispersion of particulate adhesive black resin E'.

The ink composition thus obtained exhibited a viscosity of 7.9 mPa·s (determined by an ELD type viscometer at 25° C.).

Comparative Example 14

A dispersion of particulate thermoplastic resin B' having a solid content of 50% by weight was prepared in the same manner as in Example 13 except that the dispersion of particulate thermoplastic resin B thus prepared was stirred at a high speed to make droplets having a particle diameter of about 2 µm.

The particulate material constituting the dispersion of particulate resin B' thus obtained exhibited an average particle diameter of 2.2 µm, a softening point of 125° C., MI value of 15.0 and a particle diameter distribution such that the amount of particles having a particle diameter of less than 2 µm is 47% by weight of all the particles and the amount of particles having a particle diameter of from 2 µm to 10 µm is 53% by weight of all the particles.

Preparation of Ink Composition

An ink composition was prepared in the same manner as in Example 13 except that 10 parts of the dispersion of particulate thermoplastic resin B were replaced by 10 parts of the dispersion of particulate thermoplastic resin B'.

The ink composition thus obtained exhibited a viscosity of 58 mPa·s (determined by an ELD type viscometer at 25° C. and 100 rpm) and a shear-thinning index (n) of 0.241.

Comparative Example 15

Preparation of Particulate Thermoplastic Resin

A dispersion of thermoplastic resin B" having a solid content of 50% by weight was prepared in the same manner as in Example 13 except that 134 parts of styrene and 6 parts of butyl acrylate used in the preparation of the dispersion of particulate thermoplastic resin B were replaced by 136 parts of styrene, 4 parts of butyl acrylate and 0.08 parts of divinylbenzene, respectively.

The particulate material constituting the dispersion of particulate resin B" exhibited an average particle diameter of 6.7 µm, as opening point of 190° C., MI value of 0.3 and a particle diameter distribution such that the amount of particles having a particle diameter of from 2 µm to 10 µm is 91% by weight of all the particles.

Preparation of Ink Composition

An ink composition was prepared in the same manner as in Example 14 except that 16 parts of the dispersion of particulate thermoplastic resin B were replaced by 16 parts of the dispersion of particulate thermoplastic resin B".

The ink composition thus obtained exhibited a viscosity of 83 mPa·s (determined by an ELD type viscometer at 25° C. and 100 rpm) and a shear-thinning index (n) of 0.298.

Preparation of Sample Marking Pen

The ink compositions of Examples 9 and 12 and Comparative Examples 9 and 13 were each packed into a marking pen of the same type as mentioned above to prepare sample marking pens.

Preparation of Sample Ball Point Pen

The ink compositions of Examples 10, 11, 13 and 14 and Comparative Examples 10, 11, 12, 14 and 15 were each packed into a ballpoint pen of the same type as mentioned above to prepare sample ball point pens.

Erasability Test, Fretting Resistance Test and Heat Fixability Test

Using the foregoing various sample pens, a circle having a diameter of 2 cm was continuously drawn on the surface of a report paper (Model No. Re-116AN, produced by KOKUYO CO., LTD.). The resulting writing was then rubbed 10 times with an eraser [STAR Radar, produced by Seed Rubber Industry Co., Ltd.] under a load of 2.0 kg applied to the end face thereof (area: 1.7 cm$^2$) after 5 seconds and 1 day. In this manner, the writing was visually observed for its erasability.

For the fretting resistance test, the writing was allowed to stand for 1 hour. A filter paper (No. 2 filter paper, produced by ADVANTEC CO., LTD.) was then put on the writing in an arrangement such that the smooth surface thereof faced the writing. The filter paper was then reciprocally slid along the writing 10 times under a load of 45.5 g/cm$^2$. In this manner, the writing was visually observed for fretting resistance For the heat fixability test, a circle having a diameter of 2 cm was continuously drawn on the surface of a report paper (Model No. Re-116AN, produced by KOKUYO CO., LTD.). The sheet of paper on which writing had been made was then put on the intake port (manual tray) of a copying machine (Canon NP6045). Subsequently, copying was made with no original sheet placed on the exposure table. In this manner, the sheet of paper on which writing had made was heated in contact with the heat roller in the copying machine. The writing thus heated was then rubbed 10 times with an eraser [STAR Radar, produced by Seed Rubber Industry Co., Ltd.] under a load of 2.0 kg applied to the end face thereof (area: 1.7 cm$^2$). In this manner, the writing was visually observed for fixability.

The results of erasability test, fretting resistance test and heat-fixability test, the form of writing materials and the color tone of writing of the foregoing examples and comparative examples are set forth in the tables below.

The judgment symbols for erasability, fretting resistance and heat-fixability in the tables above indicate the following:

Erasability

○: Easily erased;
X: Not erased by 10 times rubbing

Fretting Resistance

○: Little or no peeling of writing;

Heat-fixability

○: Little or no peeling of writing;
ΔA: writing slightly peeled but can be sufficiently recognized
X: Writing mostly peeled and cannot be recognized The ink composition of the present invention includes a particulate adhesive colored resin or a particulate colored resin and a particulate adhesive resin dispersed in a medium, the particulate adhesive colored resin, particulate colored resin and particulate adhesive resin each having a particle diameter distribution such that the amount of particles having a particle diameter of from 2 μm to 20 μm is not less than 70% by weight of all the particles. Since the ink composition of the present invention includes a particulate material that can little penetrate into paper and can satisfy both a good rubber-erasability and a good fretting resistance, a rubber-erasable aqueous ink for a writing material composition can be provided which gives writing on paper that can be easily erased by an eraser but can exhibit a good preservability such that it cannot be erased even when normally rubbed with finger or paper. Further, writing materials including the rubber-erasable aqueous ink for a writing material composition incorporated therein can be provided.

TABLE 5

| Example No. | Rubber-erasability test | Fretting resistance test | Heat-fixability test | Form of writing materials | Color tone of writing |
|---|---|---|---|---|---|
| Example 9 | ○ | ○ | ○ | Marking pen | Black |
| Example 10 | ○ | ○ | ○ | Ball point pen | Blue |
| Example 11 | ○ | ○ | ○ | Ball point pen | Red |
| Example 12 | ○ | ○ | ○ | Marking pen | Black |
| Example 13 | ○ | ○ | ○ | Ball point pen | Red |
| Example 14 | ○ | ○ | ○ | Ball point pen | Black |

TABLE 6

| Example No. | Rubber-erasability test | Fretting resistance test | Heat-fixability test | Form of writing materials | Color tone of writing |
|---|---|---|---|---|---|
| Comparative Example 9 | X | ○ | ○ | Marking pen | Black |
| Comparative Example 10 | X | ○ | ○ | Ball point pen | Blue |
| Comparative Example 11 | ○ | ○ | X | Ball point pen | Blue |
| Comparative Example 12 | ○ | ○ | Δ | Ball point pen | Red |
| Comparative Example 13 | X | ○ | ○ | Marking pen | Black |
| Comparative Example 14 | ○ | ○ | Δ | Ball point pen | Red |
| Comparative Example 15 | ○ | ○ | Δ | Ball point pen | Black |

Further, the ink composition including a particulate adhesive colored resin and a particulate thermoplastic resin or a particulate thermoplastic colored resin and a particulate adhesive resin dispersed in a medium. can provide a rubber-erasable aqueous ink for a writing material composition having a permanent fixability which gives writing that can be easily erased by an eraser as mentioned above but, when heated, cannot be erased by an eraser and writing materials including such a rubber-erasable aqueous ink for a writing material composition incorporated therein.

What is claimed is:

1. A rubber-erasable aqueous ink for a writing material composition comprising water, a water-soluble polar solvent, a shear-thinning agent, and a particulate adhesive colored resin comprising a pigment and an adhesive resin which is adhesive on at least a part of a surface thereof, the particulate adhesive colored resin having a particle diameter distribution such that the amount of particles having a particle diameter of from 2 μm to 20 μm is not less than 70% by weight of all the particles, wherein the particulate adhesive colored resin, when applied to and dried on a paper, is point-bonded to the surface of the paper in such an arrangement that the various adhesive colored resin particles are present independently of each other or scattered, and wherein said ink exhibits a viscosity at 100 rpm of from 25 to 160 mPa·s, determined at 25° C. by means of an EMD viscometer, and a shear-thinning index of from 0.1 to 0.7.

2. The rubber-erasable aqueous ink for a writing material composition according to claim 1, wherein the amount of the particulate adhesive colored resin is contained in the rubber-erasable aqueous ink in an amount of from 5 to 35% by weight.

3. The rubber-erasable aqueous ink for a writing material composition according to claim 1, wherein the weight ratio of the adhesive resin to the pigment constituting the particulate adhesive colored resin is from 2:1 to 40:1.

4. The rubber-erasable aqueous ink for a writing material composition according to claim 1, wherein the particulate adhesive colored resin is prepared by suspension polymerization method and the particulate adhesive colored resin includes a polymerized adhesive resin having a crosslinked structure including a radical-polymerizable monofunctional monomer and a polyfunctional monomer, the weight ratio of the polyfunctional monomer to the monofunctional monomer being from 2:100 to 10:100.

5. The rubber-erasable aqueous ink for a writing material composition according to claim 1, wherein the particulate adhesive colored resin exhibits a glass transition temperature of lower than 40° C.

6. The rubber-erasable aqueous ink for a writing material composition according to claim 1, wherein the particulate adhesive colored resin includes a pigment substantially homogeneously dispersed in an adhesive resin.

7. A marking pen including a rubber-erasable aqueous ink for a writing material composition according to claim 1.

8. The rubber-erasable aqueous ink for a writing material composition for ball point pen according to claim 1, wherein including a particle diameter distribution of all the particles contained therein is such that the amount of particles having a particle diameter of from 21 μm to 10 μm is not less than 80% by weight of all the particles contained therein.

9. The rubber-erasable aqueous ink for a writing material composition according to claim 1, further including a stabilizer for the adhesive colored resin incorporated therein.

10. A ball point pen including a rubber-erasable aqueous ink for a writing material composition for ball point pen according to claim 8 or 9 incorporated therein.

11. A rubber-erasable aqueous ink for a writing material composition comprising a particulate adhesive resin, water, a water-soluble polar solvent, a shear-thinning agent, and a particulate colored resin containing a pigment, the particulate colored resin and particulate adhesive resin each having a particle diameter distribution such that the amount of particles having a particle diameter of from 2 μm to 20 μm is not less than 70% by weight of all the particles, wherein the particulate colored resin and particulate adhesive resin, when applied to. and dried on a paper, are present in such an arrangement that the particles are point-bonded to each other and to the surface of the paper, and wherein the particulate adhesive resin exhibits a glass transition-temperature of lower than 40° C. and wherein the ink exhibits a viscosity of from 25 to 160 mPa·s at 100 rpm, determined at 25° C. by means of an EMD viscometer, and a shear-thinning index of from 0.1 to 0.7 at 100rpm.

12. The rubber-erasable aqueous ink for a writing material composition according to claim 11, wherein the particulate colored resin is a particulate material obtained by subjecting a polymerizable composition including at least a pigment and a radical-polymerizable monomer to polymerization under suspension polymerization conditions.

13. The rubber-erasable aqueous ink for a writing material composition according to claim 12, wherein the weight ratio of the resin to the pigment constituting the particulate colored resin is from 2:1 to 40:1.

14. The rubber-erasable aqueous ink for a writing material composition according to claim 11, wherein the particulate colored resin is a particulate material obtained by a process which includes melt-mixing a resin and a pigment, and then grinding the mixture in a grinding process.

15. The rubber-erasable aqueous ink for a writing material composition according to claim 11, wherein the particulate adhesive resin is a particulate material prepared by polymerization selected from the group consisting of suspension polymerization, dispersion polymerization and seed polymerization.

16. The rubber-erasable aqueous ink for a writing material composition according to claim 11, wherein the particulate colored resin and particulate adhesive resin are incorporated therein in an amount of from 5 to 30% by weight and from 0.5 to 15% by weight, respectively, and the weight ratio of the particulate colored resin to the particulate adhesive resin is from 100:2 to 100:200.

17. The rubber-erasable aqueous ink for a writing material composition according to claim 11, wherein the particulate colored resin is a particulate colored thermoplastic resin, exhibiting a softening point of from 60° C. to 180° C. and a melt flow index (MI) of from 0.1 to 30, wherein the particulate adhesive colored resin, when applied to and dried on a paper, is present in such an arrangement that particles are point-bonded to each other and to the surface of the paper, and the particulate thermoplastic colored resin, when heated, melts to fix the writing to the surface of the paper.

18. The rubber-erasable aqueous ink for a writing material composition according to claim 17, wherein the particulate colored resin is a particulate material obtained by subjecting a polymerizable composition including at least a pigment and a radical-polymerizable monomer to polymerization under suspension polymerization conditions or a particulate material obtained by a process which includes melt-mixing a thermoplastic resin and a pigment, and then grinding the mixture in a grinding process.

19. The rubber-erasable aqueous ink for a writing material composition according to claim 17, wherein the weight ratio of the thermoplastic resin to the pigment constituting the particulate colored thermoplastic resin is from 2:1 to 40:1.

20. The rubber-erasable aqueous ink for a writing material composition according to claim 17, wherein the particulate colored thermoplastic resin and particulate adhesive resin are incorporated therein in an amount of from 5 to 30% by weight and from 0.5 to 15% by weight, respectively, and the weight ratio of the particulate colored thermoplastic resin to the particulate adhesive resin is from 100:2 to 100:200.

21. The rubber-erasable aqueous ink for a writing material composition according to claim 11, wherein including a particle diameter distribution of all the particles contained therein is such that the amount of particles having a particle diameter of from 2 $\mu$m to 10 $\mu$m is not less than 80% by weight of all the particles contained therein.

22. The rubber-erasable aqueous ink for a writing material composition according to claim 11, further including a stabilizer for the particulate adhesive resin incorporated therein.

23. A ball point pen including a rubber-erasable aqueous ink for a writing material composition for ball point pen according to claim 21 or 22 incorporated therein.

* * * * *